(12) United States Patent
Lee et al.

(10) Patent No.: US 12,206,507 B2
(45) Date of Patent: Jan. 21, 2025

(54) METHOD AND APPARATUS FOR PERFORMING SIDELINK RETRANSMISSION ON BASIS OF CR IN NR V2X

(71) Applicant: LG Electronics Inc., Seoul (KR)

(72) Inventors: Seungmin Lee, Seoul (KR); Hanbyul Seo, Seoul (KR)

(73) Assignee: LG Electronics Inc., Seoul (KR)

( * ) Notice: Subject to any disclaimer, the term of this patent is extended or adjusted under 35 U.S.C. 154(b) by 431 days.

(21) Appl. No.: 17/774,721

(22) PCT Filed: Nov. 9, 2020

(86) PCT No.: PCT/KR2020/015631
§ 371 (c)(1),
(2) Date: May 5, 2022

(87) PCT Pub. No.: WO2021/091346
PCT Pub. Date: May 14, 2021

(65) Prior Publication Data
US 2022/0399963 A1 Dec. 15, 2022

Related U.S. Application Data

(60) Provisional application No. 62/933,365, filed on Nov. 8, 2019.

(51) Int. Cl.
*H04L 1/1829* (2023.01)
*H04L 1/1812* (2023.01)
(Continued)

(52) U.S. Cl.
CPC .......... *H04L 1/1854* (2013.01); *H04L 1/1812* (2013.01); *H04L 5/0044* (2013.01);
(Continued)

(58) Field of Classification Search
None
See application file for complete search history.

(56) References Cited

U.S. PATENT DOCUMENTS 11,979,857 B2 * 5/2024 Peng ................. H04W 72/0446
2014/0177573 A1 * 6/2014 Han ..................... H04L 5/0044
370/329
(Continued)

FOREIGN PATENT DOCUMENTS

WO  WO-2021091340 A1 * 5/2021 ........... H04L 1/1614

OTHER PUBLICATIONS

Huawei & HiSilicon, "Sidelink physical layer procedures for NR V2X," R1-1906008, Presented at 3GPP TSG RAN WG1 Meeting #97, Reno, USA, May 13-17, 2019, 23 pages.
(Continued)

*Primary Examiner* — Otis L Thompson, Jr.
(74) *Attorney, Agent, or Firm* — Fish & Richardson P.C.

(57) ABSTRACT

A method by which a first device performs wireless communication is presented. The method can comprise the step of transmitting data through a physical sidelink shared channel (PSSCH) to a second device, receiving, from the second device, hybrid automatic repeat request (HARQ) feedback related to the data through a physical sidelink feedback channel (PSFCH), and acquiring a channel occupancy ratio (CR) for a transmission resource related to the data in a first slot. For example, the transmission resource related to the data remaining after the reception of the HARQ feedback can be released, and the transmission resource related to the data, released after the first slot, cannot be considered with respect to the CR.

15 Claims, 23 Drawing Sheets

(51) Int. Cl.
*H04L 5/00* (2006.01)
*H04W 28/26* (2009.01)
*H04W 74/0808* (2024.01)
*H04W 4/40* (2018.01)

(52) U.S. Cl.
CPC .......... *H04L 5/0055* (2013.01); *H04W 28/26* (2013.01); *H04W 74/0808* (2013.01); *H04W 4/40* (2018.02)

(56) References Cited

U.S. PATENT DOCUMENTS

| | | | |
|---|---|---|---|
| 2018/0234973 A1 | 8/2018 | Lee et al. | |
| 2019/0182705 A1* | 6/2019 | Chung | H04W 24/10 |
| 2019/0208441 A1* | 7/2019 | Wang | H04W 72/02 |
| 2019/0394786 A1* | 12/2019 | Parron | H04W 4/46 |
| 2020/0187252 A1* | 6/2020 | Lee | H04L 1/1819 |
| 2020/0288432 A1* | 9/2020 | Min | H04W 4/40 |
| 2020/0322095 A1* | 10/2020 | Park | H04L 1/1864 |
| 2020/0382992 A1* | 12/2020 | Shilov | H04W 72/56 |
| 2021/0051510 A1* | 2/2021 | Chae | H04B 17/318 |
| 2021/0067290 A1* | 3/2021 | Chen | H04L 5/0033 |
| 2021/0105787 A1* | 4/2021 | Park | H04W 72/02 |
| 2021/0219314 A1* | 7/2021 | Osawa | H04W 76/14 |
| 2021/0410114 A1* | 12/2021 | Lee | H04L 1/189 |
| 2022/0124562 A1* | 4/2022 | Yu | H04W 72/20 |
| 2022/0173854 A1* | 6/2022 | Chae | H04L 1/1893 |
| 2022/0394560 A1* | 12/2022 | Yu | H04W 72/0446 |
| 2023/0007629 A1* | 1/2023 | Min | H04W 4/40 |

OTHER PUBLICATIONS

LG Electronics, "Summary of RAN1 Agreements/Working assumptions in WI 5G V2X with NR Sidelink," R1-1911725, Presented at 3GPP TSG RAN WG1 #98bis, Chongqing, China, Oct. 14-20, 2019, 22 pages.

MediaTek Inc., "On sidelink resource allocation mechanism," R1-1900199, Presented at 3GPP TSG RAN WG1 Ad-Hoc Meeting 1901, Taipei, Taiwan, Jan. 21-25, 2019, 10 pages.

Vivo, "Discussion on mode 2 resource allocation mechanism," R1-1906139, Presented at 3GPP TSG RAN WG1 #97, Reno, USA, May 13-17, 2019, 13 pages.

* cited by examiner

FIG. 4
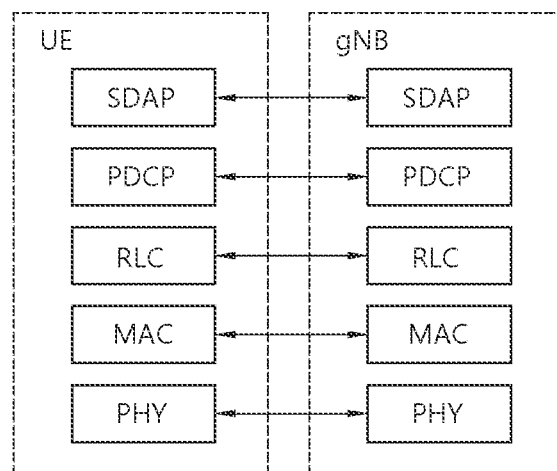
(a)
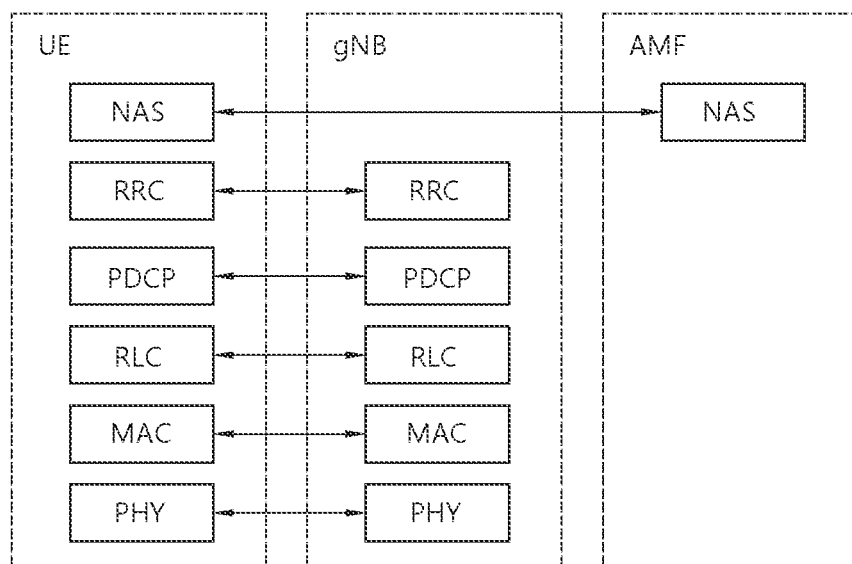
(b)

FIG. 8
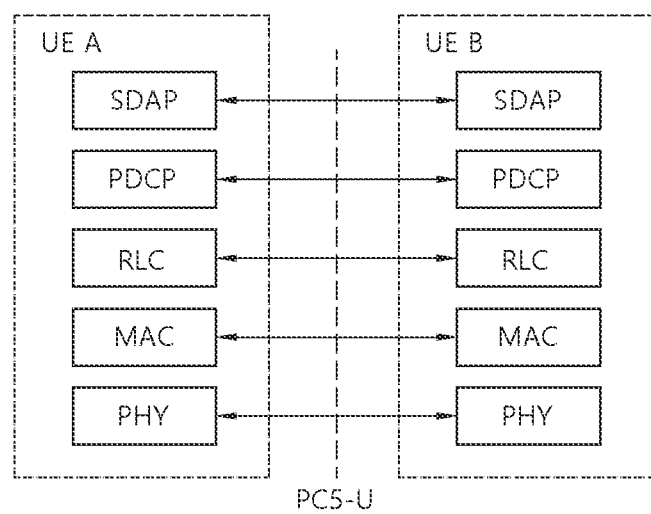
(a)
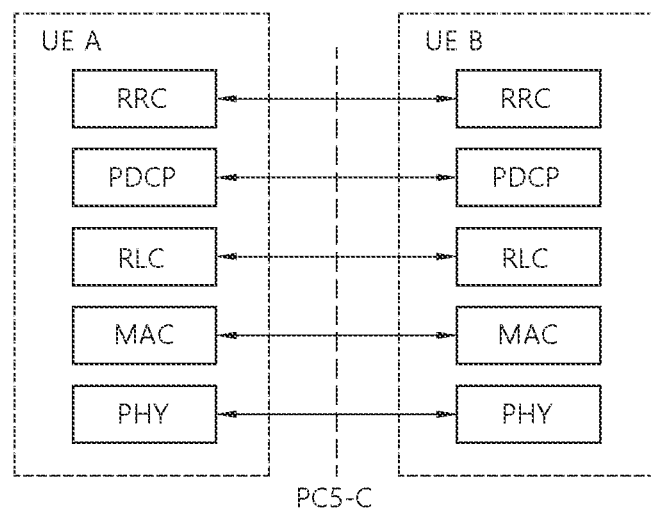
(b)

FIG. 12
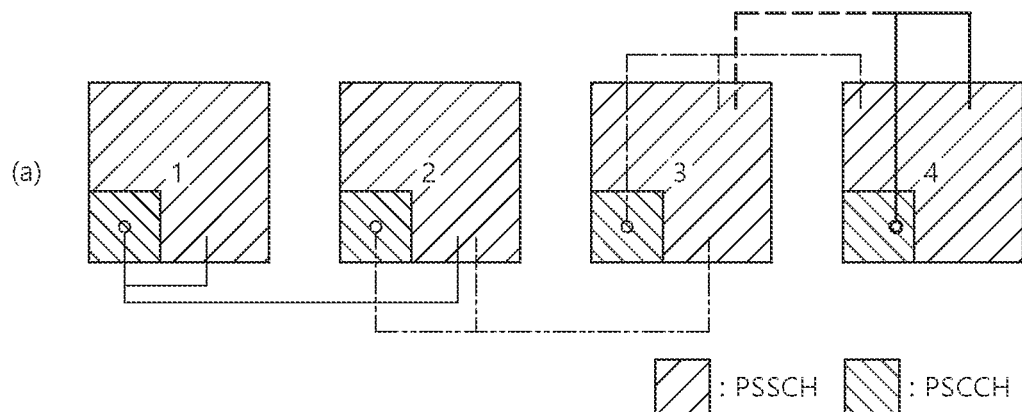
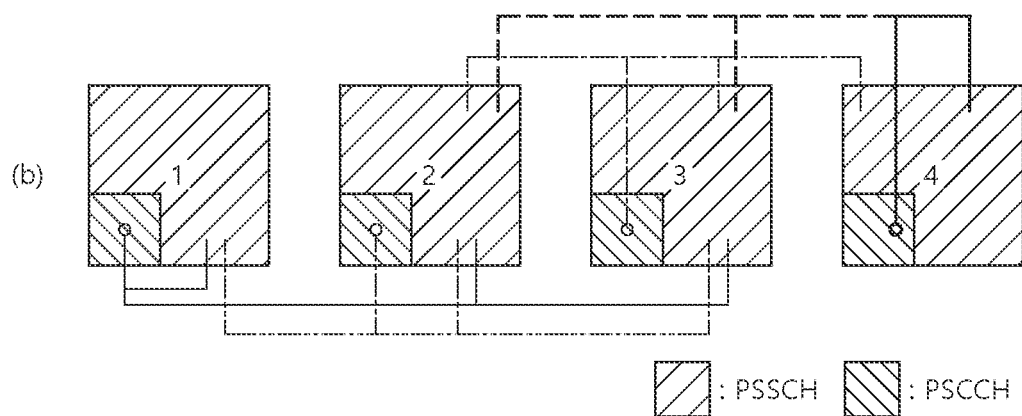
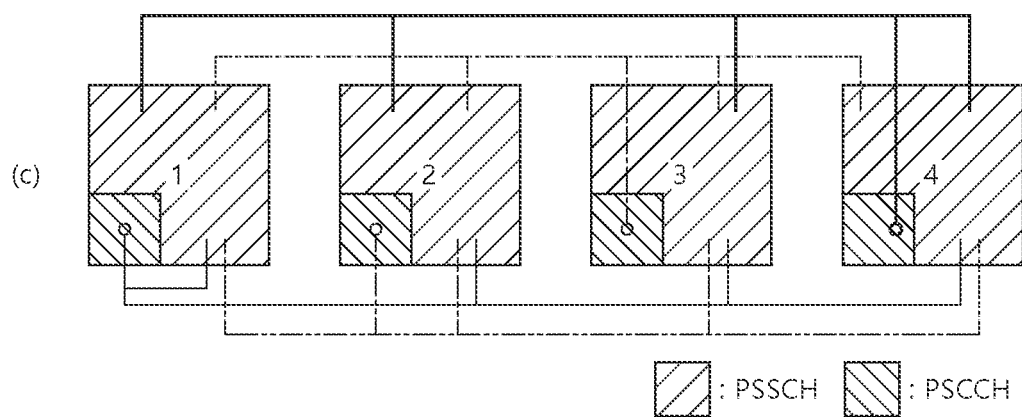

METHOD AND APPARATUS FOR PERFORMING SIDELINK RETRANSMISSION ON BASIS OF CR IN NR V2X

CROSS-REFERENCE TO RELATED APPLICATIONS

This application is a National Stage application under 35 U.S.C. § 371 of International Application No. PCT/KR2020/015631, filed on Nov. 9, 2020, which claims the benefit of U.S. Provisional Application No. 62/933,365, filed on Nov. 8, 2019. The disclosures of the prior applications are hereby incorporated by reference herein in their entirety.

BACKGROUND OF THE DISCLOSURE

Field of the Disclosure

This disclosure relates to a wireless communication system.

Related Art

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic.

Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

FIG. 1 is a drawing for describing V2X communication based on NR, compared to V2X communication based on RAT used before NR. The embodiment of FIG. 1 may be combined with various embodiments of the present disclosure.

Regarding V2X communication, a scheme of providing a safety service, based on a V2X message such as Basic Safety Message (BSM), Cooperative Awareness Message (CAM), and Decentralized Environmental Notification Message (DENM) is focused in the discussion on the RAT used before the NR. The V2X message may include position information, dynamic information, attribute information, or the like. For example, a UE may transmit a periodic message type CAM and/or an event triggered message type DENM to another UE.

For example, the CAM may include dynamic state information of the vehicle such as direction and speed, static data of the vehicle such as a size, and basic vehicle information such as an exterior illumination state, route details, or the like. For example, the UE may broadcast the CAM, and latency of the CAM may be less than 100 ms. For example, the UE may generate the DENM and transmit it to another UE in an unexpected situation such as a vehicle breakdown, accident, or the like. For example, all vehicles within a transmission range of the UE may receive the CAM and/or the DENM. In this case, the DENM may have a higher priority than the CAM.

Thereafter, regarding V2X communication, various V2X scenarios are proposed in NR. For example, the various V2X scenarios may include vehicle platooning, advanced driving, extended sensors, remote driving, or the like.

For example, based on the vehicle platooning, vehicles may move together by dynamically forming a group. For example, in order to perform platoon operations based on the vehicle platooning, the vehicles belonging to the group may receive periodic data from a leading vehicle. For example, the vehicles belonging to the group may decrease or increase an interval between the vehicles by using the periodic data.

For example, based on the advanced driving, the vehicle may be semi-automated or fully automated. For example, each vehicle may adjust trajectories or maneuvers, based on data obtained from a local sensor of a proximity vehicle and/or a proximity logical entity. In addition, for example, each vehicle may share driving intention with proximity vehicles.

For example, based on the extended sensors, raw data, processed data, or live video data obtained through the local sensors may be exchanged between a vehicle, a logical entity, a UE of pedestrians, and/or a V2X application server. Therefore, for example, the vehicle may recognize a more improved environment than an environment in which a self-sensor is used for detection.

For example, based on the remote driving, for a person who cannot drive or a remote vehicle in a dangerous environment, a remote driver or a V2X application may operate or control the remote vehicle. For example, if a route is predictable such as public transportation, cloud computing based driving may be used for the operation or control of the remote vehicle. In addition, for example, an access for a cloud-based back-end service platform may be considered for the remote driving.

Meanwhile, a scheme of specifying service requirements for various V2X scenarios such as vehicle platooning, advanced driving, extended sensors, remote driving, or the like is discussed in NR-based V2X communication.

SUMMARY OF THE DISCLOSURE

Technical Objects

On the other hand, in NR V2X, a transmitting UE may reserve several potential (re)transmission resources, considering the possibility of performing retransmission based on received hybrid automatic repeat request (HARQ) feedback information and the probability that a transmission resource of a transmitting UE collides with a transmission resource of another UE. For example, a transmitting UE may determine the possibility of performing retransmission related to HARQ feedback information and the probability that a transmission resource of a transmitting UE collides with a transmission resource of another UE. For example, a transmitting UE may reserve a plurality of potential (re)transmission resources based on the possibility of performing a retransmission and the collision probability. Here, for example, a transmitting UE may receive HARQ-ACK information from a receiving UE, for efficient use/sharing of resources, a transmitting UE may release remaining potential retransmission resources or may not use remaining potential retransmission resources.

For example, a transmitting UE may select/reserve a potential retransmission resource for a retransmission operation based on hybrid automatic repeat request (HARQ) feedback reception. In this case, retransmission resources remaining after the time when a transmitting UE receives ACK information from a receiving UE may be released. In this case, how a transmitting UE reflects a released retransmission resource when calculating channel occupancy ratio (CR) may be a problem.

Technical Solutions

On the other hand, in NR V2X, a transmitting UE may reserve several potential (re)transmission resources, considering the possibility of performing retransmission based on received hybrid automatic repeat request (HARQ) feedback information and the probability that a transmission resource of a transmitting UE collides with a transmission resource of another UE. For example, a transmitting UE may determine the possibility of performing retransmission related to HARQ feedback information and the probability that a transmission resource of a transmitting UE collides with a transmission resource of another UE. For example, a transmitting UE may reserve a plurality of potential (re)transmission resources based on the possibility of performing a retransmission and the collision probability. Here, for example, a transmitting UE may receive HARQ-ACK information from a receiving UE, for efficient use/sharing of resources, a transmitting UE may release remaining potential retransmission resources or may not use remaining potential retransmission resources.

Effects of the Disclosure

The user equipment (UE) may efficiently perform SL communication.

BRIEF DESCRIPTION OF THE DRAWINGS

FIG. 4 shows a radio protocol architecture, in accordance with an embodiment of the present disclosure.

FIG. 8 shows a radio protocol architecture for a SL communication, in accordance with an embodiment of the present disclosure.

FIG. 12 shows a method in which a UE that has reserved transmission resource(s) informs another UE of the transmission resource(s), based on an embodiment of the present disclosure.

DESCRIPTION OF EXEMPLARY EMBODIMENTS

Figure 1:
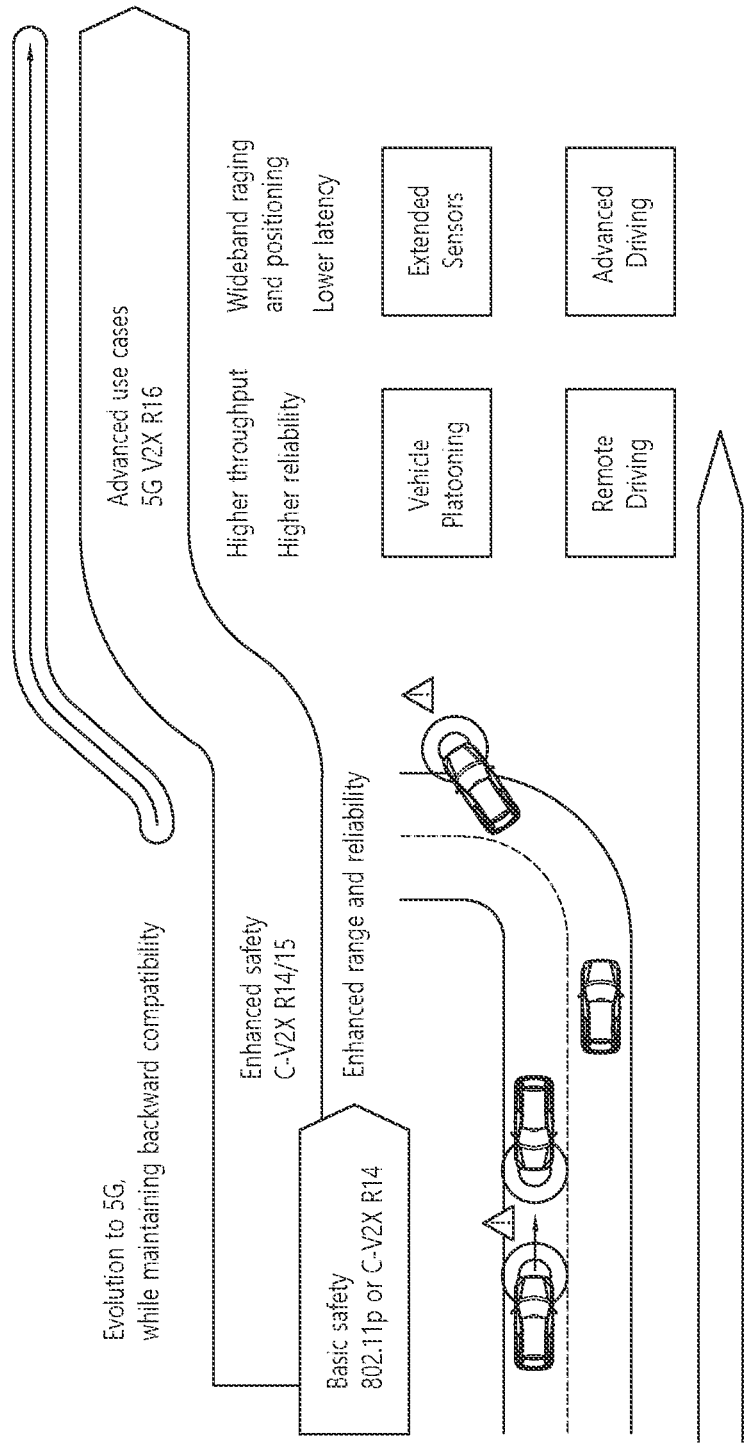
FIG. 1 is a drawing for describing V2X communication based on NR, compared to V2X communication based on RAT used before NR.

In the present specification, "A or B" may mean "only A", "only B" or "both A and B." In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (PDCCH)", it may mean that "PDCCH" is proposed as an example of the "control information". In other words, the "control information" of the present specification is not limited to "PDCCH", and "PDCCH" may be proposed as an example of the "control information". In addition, when indicated as "control information (i.e., PDCCH)", it may also mean that "PDCCH" is proposed as an example of the "control information".

A technical feature described individually in one figure in the present specification may be individually implemented, or may be simultaneously implemented.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

Figure 2:
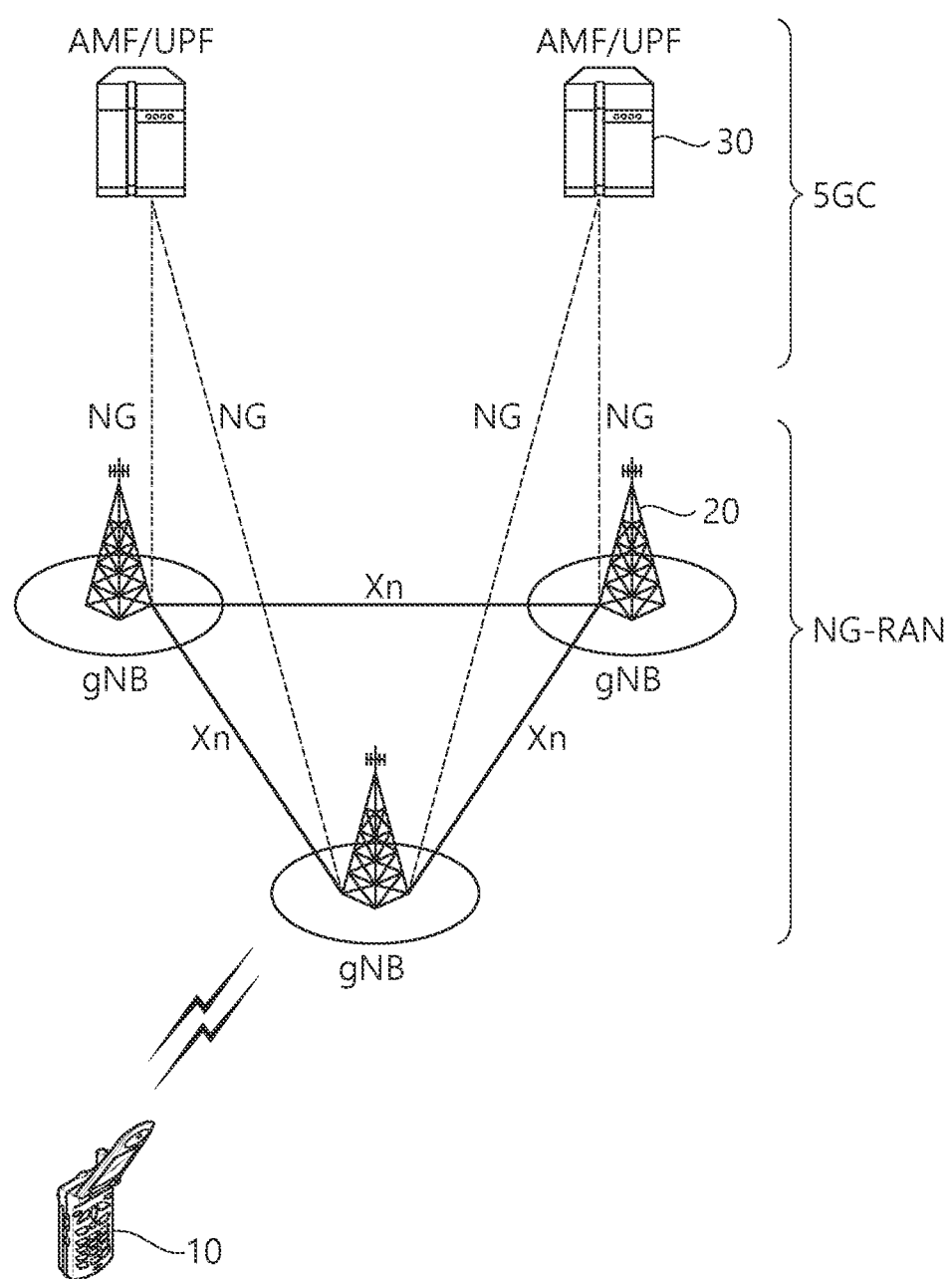
FIG. 2 shows a structure of an NR system, in accordance with an embodiment of the present disclosure.

FIG. 2 shows a structure of an NR system, in accordance with an embodiment of the present disclosure. The embodiment of FIG. 2 may be combined with various embodiments of the present disclosure.

Referring to FIG. 2, a next generation-radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 2 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Figure 3:
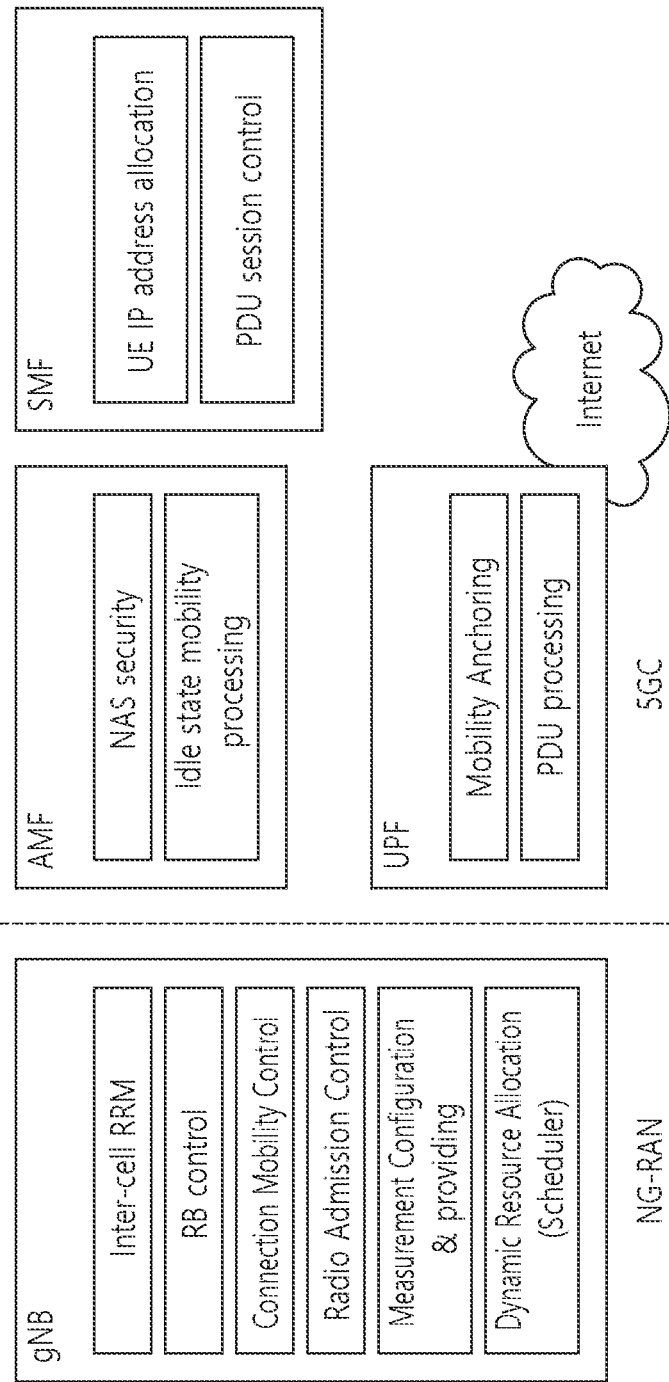
FIG. 3 shows a functional division between an NG-RAN and a 5GC, in accordance with an embodiment of the present disclosure.

FIG. 3 shows a functional division between an NG-RAN and a 5GC, in accordance with an embodiment of the present disclosure.

Referring to FIG. 3, the gNB may provide functions, such as Inter Cell Radio Resource Management (RRM), Radio Bearer (RB) control, Connection Mobility Control, Radio Admission Control, Measurement Configuration & Provision, Dynamic Resource Allocation, and so on. An AMF may provide functions, such as Non Access Stratum (NAS) security, idle state mobility processing, and so on. A UPF may provide functions, such as Mobility Anchoring, Protocol Data Unit (PDU) processing, and so on. A Session Management Function (SMF) may provide functions, such as user equipment (UE) Internet Protocol (IP) address allocation, PDU session control, and so on.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

FIG. 4 shows a radio protocol architecture, in accordance with an embodiment of the present disclosure. The embodiment of FIG. 4 may be combined with various embodiments of the present disclosure. Specifically, FIG. 4(a) shows a radio protocol architecture for a user plane, and FIG. 4(b) shows a radio protocol architecture for a control plane. The user plane corresponds to a protocol stack for user data transmission, and the control plane corresponds to a protocol stack for control signal transmission.

Referring to FIG. 4, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., the MAC layer, the RLC layer, and the packet data convergence protocol (PDCP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several OFDM symbols in a time domain and several sub-carriers in a frequency domain. One sub-frame includes a plurality of OFDM symbols in a time region. A resource block is a unit of resource allocation, and consists of a plurality of OFDM symbols and a plurality of sub-carriers. Further, each sub-frame may use specific sub-carriers of specific OFDM symbols (e.g., a first OFDM symbol) of a corresponding subframe for a physical downlink control channel (PDCCH), i.e., an L1/L2 control channel. A transmission time interval (TTI) is a unit time of subframe transmission.

Figure 5:
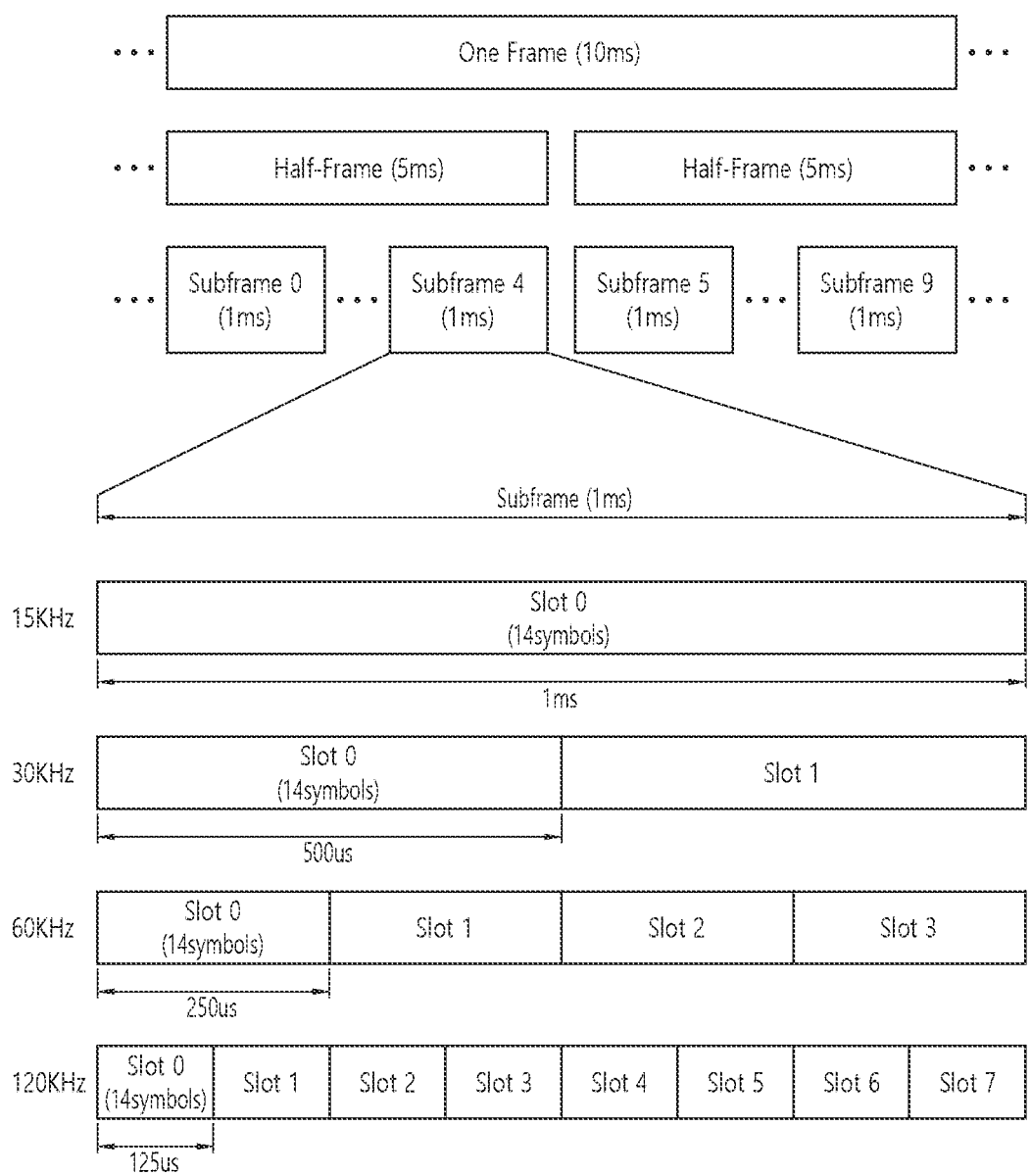
FIG. 5 shows a structure of an NR system, in accordance with an embodiment of the present disclosure.

FIG. 5 shows a structure of an NR system, in accordance with an embodiment of the present disclosure. The embodiment of FIG. 5 may be combined with various embodiments of the present disclosure.

Referring to FIG. 5, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined in accordance with subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) in accordance with an SCS configuration (u), in a case where a normal CP is used.

TABLE 1

| SCS ($15*2^u$) | $N^{slot}_{symb}$ | $N^{frame, u}_{slot}$ | $N^{subframe, u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe in accordance with the SCS, in a case where an extended CP is used.

TABLE 2

| SCS ($15*2^u$) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 6:
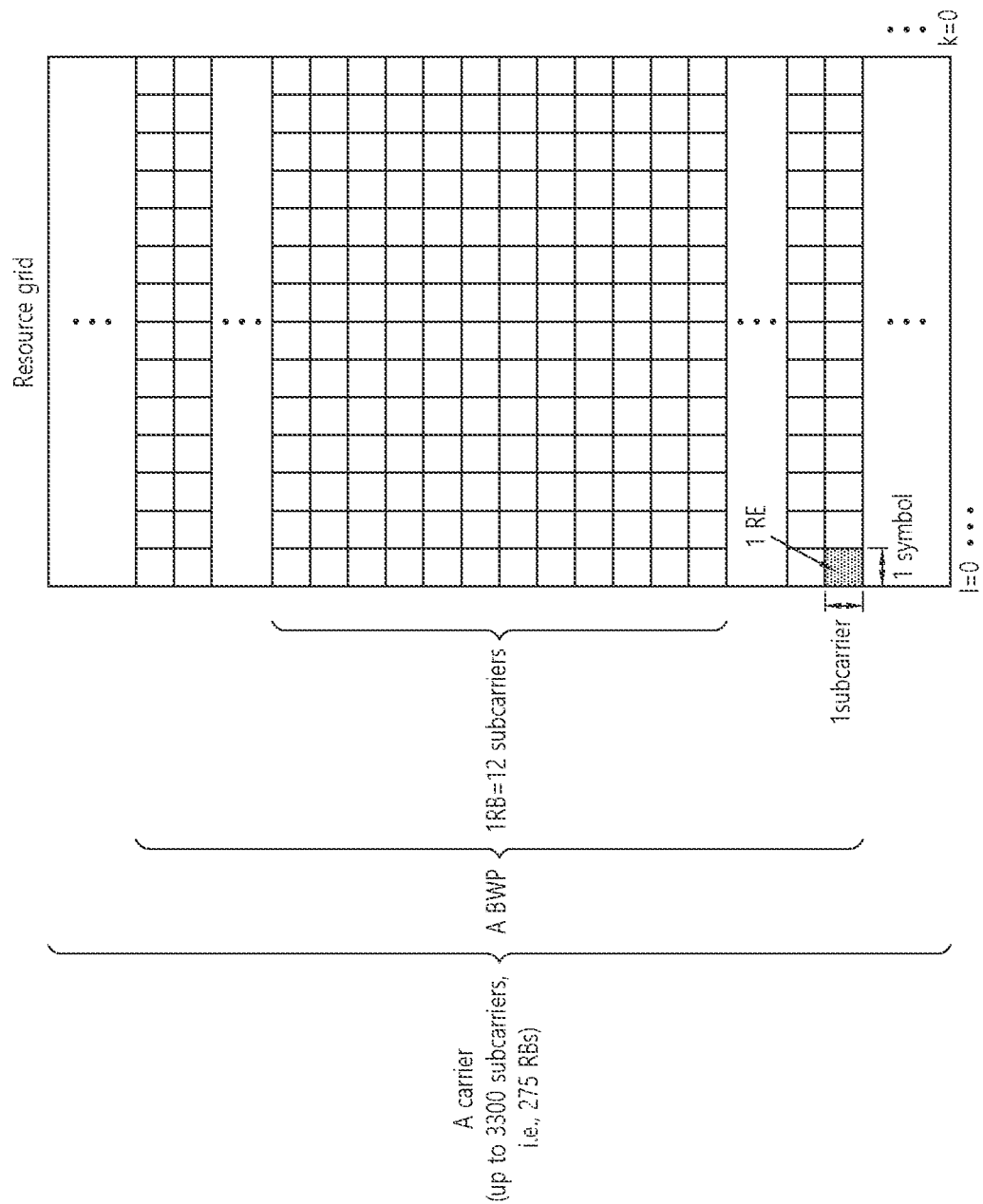
FIG. 6 shows a structure of a slot of an NR frame, in accordance with an embodiment of the present disclosure.

FIG. 6 shows a structure of a slot of an NR frame, in accordance with an embodiment of the present disclosure.

Referring to FIG. 6, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Meanwhile, a radio interface between a UE and another UE or a radio interface between the UE and a network may consist of an L1 layer, an L2 layer, and an L3 layer. In various embodiments of the present disclosure, the L1 layer may imply a physical layer. In addition, for example, the L2 layer may imply at least one of a MAC layer, an RLC layer, a PDCP layer, and an SDAP layer. In addition, for example, the L3 layer may imply an RRC layer.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier.

When using bandwidth adaptation (BA), a reception bandwidth and transmission bandwidth of a UE are not necessarily as large as a bandwidth of a cell, and the reception bandwidth and transmission bandwidth of the BS may be adjusted. For example, a network/BS may inform the UE of bandwidth adjustment. For example, the UE receive information/configuration for bandwidth adjustment from the network/BS. In this case, the UE may perform bandwidth adjustment based on the received information/configuration. For example, the bandwidth adjustment may include an increase/decrease of the bandwidth, a position change of the bandwidth, or a change in subcarrier spacing of the bandwidth.

For example, the bandwidth may be decreased during a period in which activity is low to save power. For example, the position of the bandwidth may move in a frequency domain. For example, the position of the bandwidth may move in the frequency domain to increase scheduling flexibility. For example, the subcarrier spacing of the bandwidth may be changed. For example, the subcarrier spacing of the bandwidth may be changed to allow a different service. A subset of a total cell bandwidth of a cell may be called a bandwidth part (BWP). The BA may be performed when the BS/network configures the BWP to the UE and the BS/network informs the UE of the BWP currently in an active state among the configured BWPs.

For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, PDSCH, or CSI-RS (excluding RRM) outside the active DL BWP. For example, the UE may not trigger a channel state information (CSI) report for the inactive DL BWP. For example, the UE may not transmit PUCCH or PUSCH outside an active UL BWP. For example, in a downlink case, the initial BWP may be given as a consecutive RB set for an RMSI CORESET (configured by PBCH). For example, in an uplink case, the initial BWP may be given by SIB for a random access procedure. For example, the default BWP may be configured by a higher layer. For example, an initial value of the default BWP may be an initial DL BWP. For energy saving, if the UE fails to detect DCI during a specific period, the UE may switch the active BWP of the UE to the default BWP.

Meanwhile, the BWP may be defined for SL. The same SL BWP may be used in transmission and reception. For example, a transmitting UE may transmit an SL channel or an SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 7:
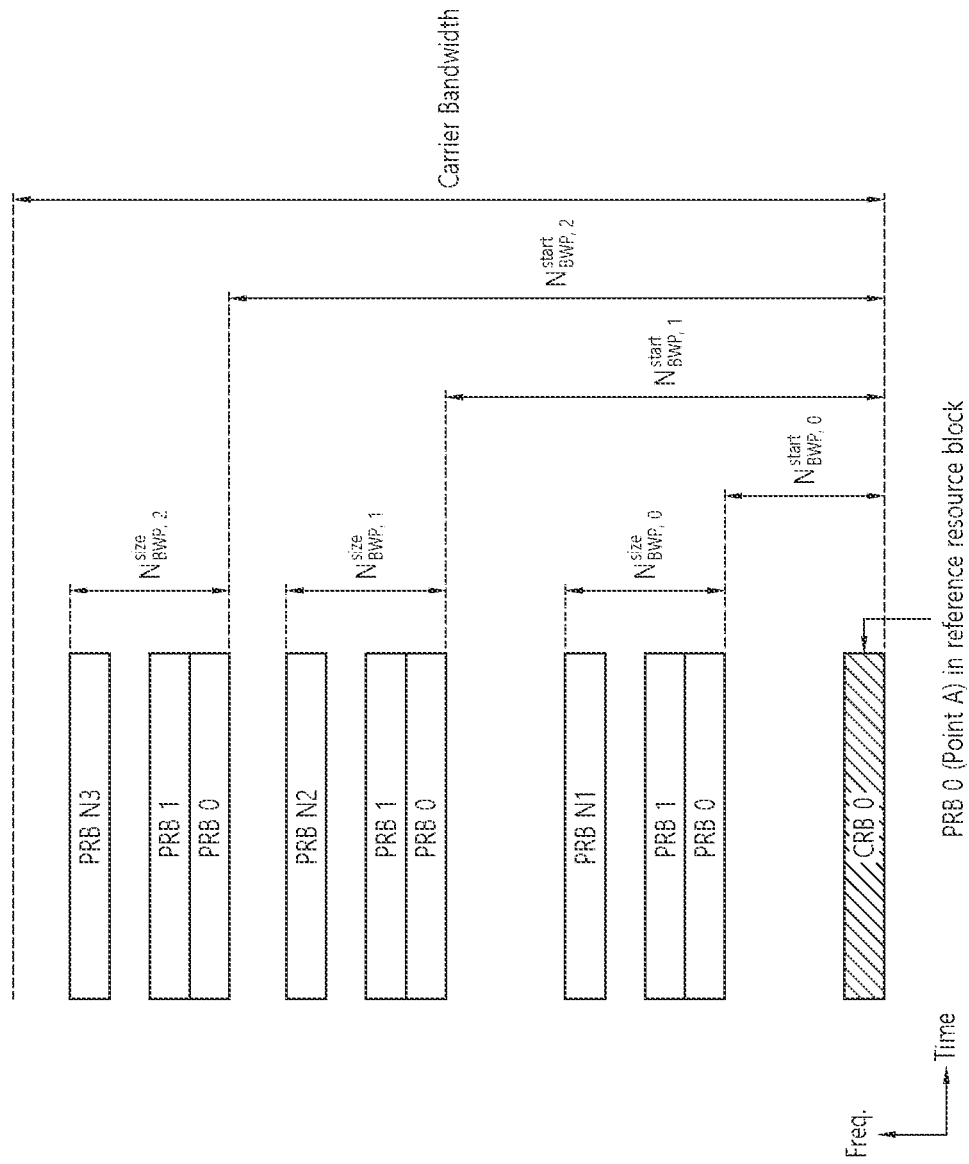
FIG. 7 shows an example of a BWP, in accordance with an embodiment of the present disclosure.

FIG. 7 shows an example of a BWP, in accordance with an embodiment of the present disclosure. The embodiment of FIG. 7 may be combined with various embodiments of the present disclosure. It is assumed in the embodiment of FIG. 7 that the number of BWPs is 3.

Referring to FIG. 7, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

FIG. 8 shows a radio protocol architecture for a SL communication, in accordance with an embodiment of the present disclosure. The embodiment of FIG. 8 may be combined with various embodiments of the present disclosure. More specifically, FIG. 8(a) shows a user plane protocol stack, and FIG. 8(b) shows a control plane protocol stack.

Hereinafter, a sidelink synchronization signal (SLSS) and synchronization information will be described.

The SLSS may include a primary sidelink synchronization signal (PSSS) and a secondary sidelink synchronization signal (SSSS), as an SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit CRC.

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 9:
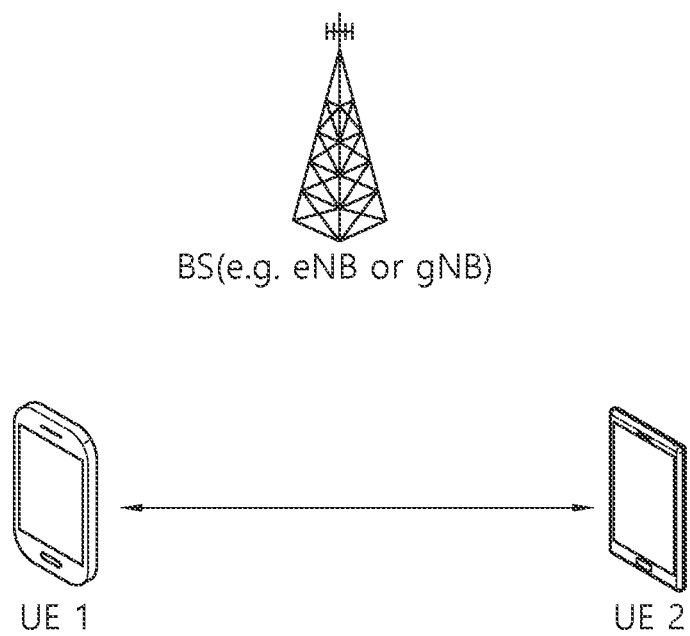
FIG. 9 shows a UE performing V2X or SL communication, in accordance with an embodiment of the present disclosure.

FIG. 9 shows a UE performing V2X or SL communication, in accordance with an embodiment of the present disclosure. The embodiment of FIG. 9 may be combined with various embodiments of the present disclosure.

Referring to FIG. 9, in V2X or SL communication, the term 'UE' may generally imply a UE of a user. However, if a network equipment such as a BS transmits/receives a signal according to a communication scheme between UEs, the BS may also be regarded as a sort of the UE. For example, a UE 1 may be a first apparatus 100, and a UE 2 may be a second apparatus 200.

For example, the UE 1 may select a resource unit corresponding to a specific resource in a resource pool which implies a set of series of resources. In addition, the UE 1 may transmit an SL signal by using the resource unit. For example, a resource pool in which the UE 1 is capable of transmitting a signal may be configured to the UE 2 which is a receiving UE, and the signal of the UE 1 may be detected in the resource pool.

Herein, if the UE 1 is within a connectivity range of the BS, the BS may inform the UE 1 of the resource pool. Otherwise, if the UE 1 is out of the connectivity range of the BS, another UE may inform the UE 1 of the resource pool, or the UE 1 may use a pre-configured resource pool.

In general, the resource pool may be configured in unit of a plurality of resources, and each UE may select a unit of one or a plurality of resources to use it in SL signal transmission thereof.

Hereinafter, resource allocation in SL will be described.

Figure 10:
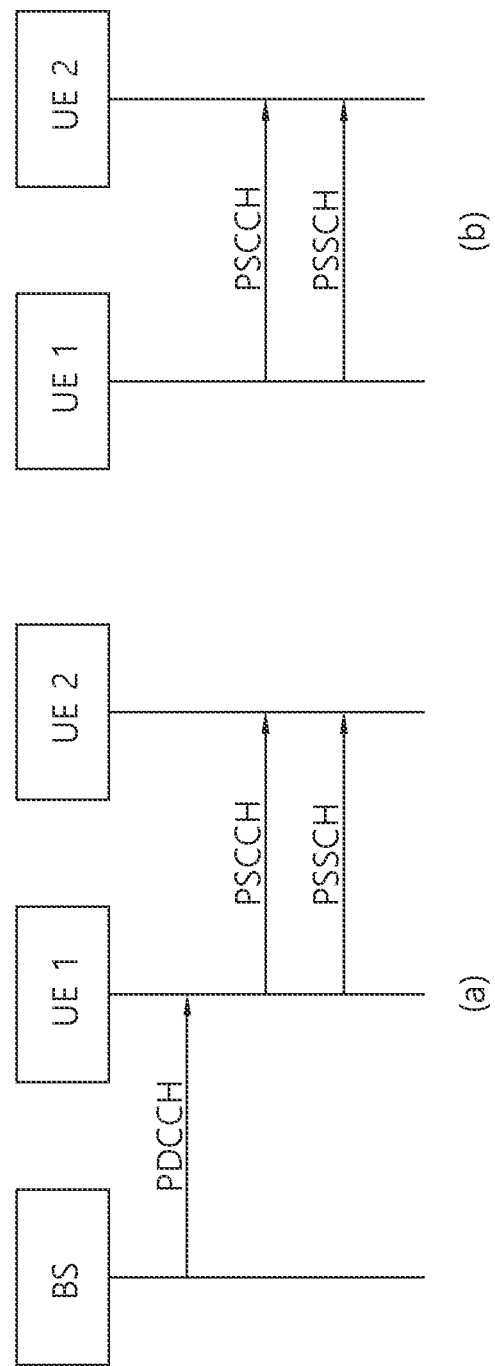
FIG. 10 shows a procedure of performing V2X or SL communication by a UE based on a transmission mode, in accordance with an embodiment of the present disclosure.

FIG. 10 shows a procedure of performing V2X or SL communication by a UE based on a transmission mode, in accordance with an embodiment of the present disclosure. The embodiment of FIG. 10 may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, FIG. 10(a) shows a UE operation related to an LTE transmission mode 1 or an LTE transmission mode 3. Alternatively, for example, FIG. 10(a) shows a UE operation related to an NR resource allocation mode 1. For example, the LTE transmission mode 1 may be applied to general SL communication, and the LTE transmission mode 3 may be applied to V2X communication.

For example, FIG. 10(b) shows a UE operation related to an LTE transmission mode 2 or an LTE transmission mode 4. Alternatively, for example, FIG. 10(b) shows a UE operation related to an NR resource allocation mode 2.

Referring to FIG. 10(a), in the LTE transmission mode 1, the LTE transmission mode 3, or the NR resource allocation mode 1, a BS may schedule an SL resource to be used by the UE for SL transmission. For example, the BS may perform resource scheduling to a UE 1 through a PDCCH (more specifically, downlink control information (DCI)), and the UE 1 may perform V2X or SL communication with respect to a UE 2 according to the resource scheduling. For example, the UE 1 may transmit a sidelink control information (SCI) to the UE 2 through a physical sidelink control channel (PSCCH), and thereafter transmit data based on the SCI to the UE 2 through a physical sidelink shared channel (PSSCH).

Referring to FIG. 10(b), in the LTE transmission mode 2, the LTE transmission mode 4, or the NR resource allocation mode 2, the UE may determine an SL transmission resource within an SL resource configured by a BS/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selective window by performing a sensing and resource (re)selection procedure. For example, the sensing may be performed in unit of subchannels. In addition, the UE 1 which has autonomously selected the resource within the resource pool may transmit the SCI to the UE 2 through a PSCCH, and thereafter may transmit data based on the SCI to the UE 2 through a PSSCH.

Figure 11:
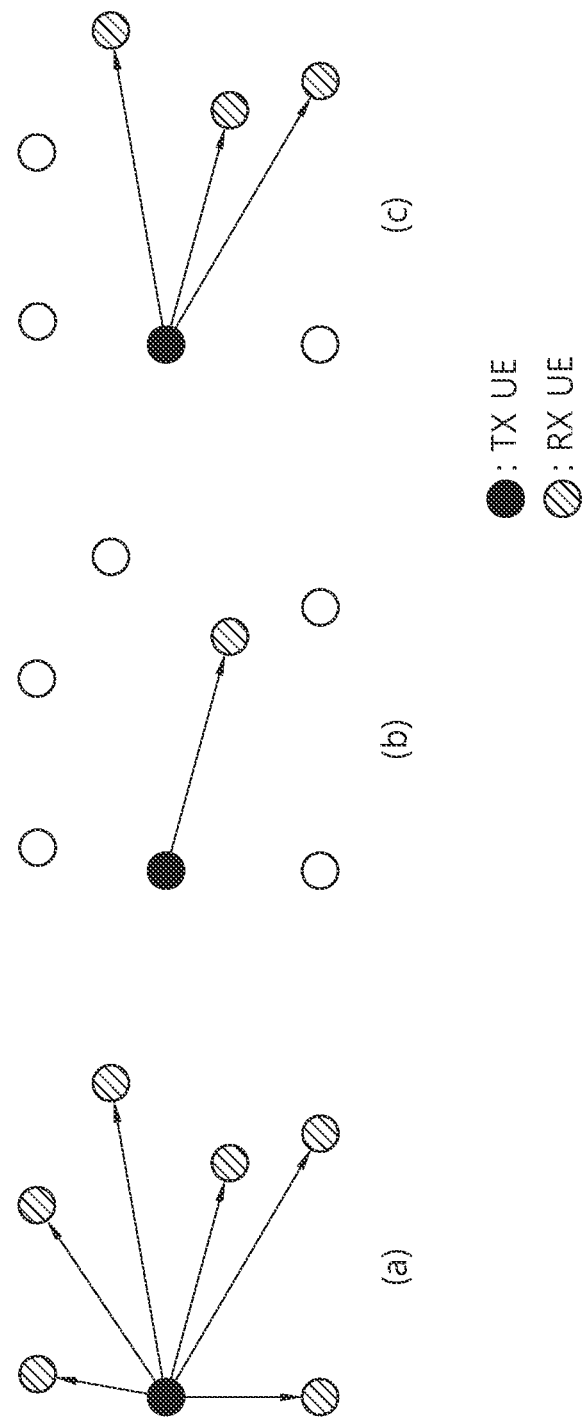
FIG. 11 shows three cast types, in accordance with an embodiment of the present disclosure.

FIG. 11 shows three cast types, in accordance with an embodiment of the present disclosure. The embodiment of FIG. 11 may be combined with various embodiments of the present disclosure. Specifically, FIG. 11(a) shows broadcast-type SL communication, FIG. 11(b) shows unicast type-SL communication, and FIG. 11(c) shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

Meanwhile, in various embodiments of the present disclosure, a transmitting UE (i.e., TX UE) may be a UE which transmits data to (target) receiving UE(s) (i.e., RX UE(s)). For example, the TX UE may be a UE which performs PSCCH transmission and/or PSSCH transmission. And/or, for example, the TX UE may be a UE which transmits SL CSI-RS(s) and/or a SL CSI report request indication to (target) RX UE(s). For example, the TX UE may be a UE which transmits a (control) channel (e.g., PSCCH, PSSCH, etc.) and/or reference signal(s) (e.g., DM-RS(s), CSI-RS(s), etc.) through the (control) channel, which is/are used for SL radio link monitoring (RLM) operation(s) and/or SL radio link failure (RLF) operation(s) of (target) RX UE(s).

Meanwhile, in various embodiments of the present disclosure, a receiving UE (i.e., RX UE) may be a UE which transmits SL HARQ feedback to transmitting UE(s) (i.e., TX UE(s)), based on whether or not data transmitted by TX UE(s) is decoded successfully and/or whether or not a PSCCH (related to PSSCH scheduling) transmitted by TX UE(s) is detected/decoded successfully. For example, the RX UE may be a UE which performs SL CSI transmission to TX UE(s) based on SL CSI-RS(s) and/or a SL CSI report request indication received from TX UE(s). For example, the RX UE may be a UE which transmits, to TX UE(s), an SL (L1) RSRP measurement value measured based on (pre-defined) reference signal(s) and/or SL (L1) RSRP report request indication received from TX UE(s). For example, the RX UE may be a UE which transmits its own data to TX UE(s). For example, the RX UE may be a UE which performs SL RLM operation(s) and/or SL RLF operation(s) based on a (pre-configured) (control) channel and/or reference signal(s) through the (control) channel received from TX UE(s).

Meanwhile, in various embodiments of the present disclosure, when a receiving UE transmits SL HARQ feedback information for a PSSCH and/or a PSCCH received from a transmitting UE, the following method may be considered or partly considered. Here, for example, the corresponding scheme or some schemes may be limitedly applied only when a receiving UE successfully decodes/detects a PSCCH for scheduling a PSSCH.

(1) Groupcast Option 1: transmit NACK information to a TX UE, only when an RX UE fails to decode/receive a PSSCH received from the TX UE.
(2) Groupcast Option 2: transmit ACK information to a TX UE when an RX UE succeeds to decode/receive a PSSCH, or if it fails to decode/receive a PSSCH, transmit NACK information to a TX UE.

Meanwhile, in various embodiments of the present disclosure, for example, a TX UE may transmit at least one of the following information to an RX UE through SCI. Here, for example, a TX UE may transmit at least one of the following information to an RX UE through first SCI and/or second SCI.

PSSCH (and/or PSCCH) related resource allocation information (e.g., location/number of time/frequency resources, resource reservation information (e.g., period))

SL CSI report request indicator or SL (L1) RSRP (and/or SL (L1) RSRQ and/or SL (L1) RSSI) report request indicator (on PSSCH) SL CSI transmission indicator (or SL (L1) RSRP (and/or SL (L1) RSRQ and/or SL (L1) RSSI) information transmission indicator)

Modulation and Coding Scheme (MCS) information transmit power information

L1 destination ID information and/or L1 source ID information

SL HARQ process ID information new data indicator (NDI) information redundancy version (RV) information (transmission traffic/packet related) QoS information (e.g., priority information)

SL CSI-RS transmission indicator or the number of (transmitted) SL CSI-RS antenna ports information location information of TX UE or location (or distance region) information of a target RX UE (where SL HARQ feedback is required)

information on decoding of data transmitted through PSSCH and/or a reference signal (e.g., DM-RS, etc.) related to channel estimation. For example, the information on a reference signal may be information related to the pattern of the (time-frequency) mapping resource of a DM-RS, RANK information, antenna port index information, antenna port number information, etc.

Meanwhile, in various embodiments of the present disclosure, for example, since a TX UE can transmit SCI, first SCI and/or second SCI to an RX UE through PSCCH, a PSCCH may be replaced/substituted with at least one of a SCI, a first SCI ($1^{st}$-stage SCI), and/or a second SCI ($2^{nd}$-stage SCI), or vice versa. For example, a SCI may be replaced/substituted with at least one of a PSCCH, a first SCI, and/or a second SCI, or vice versa. For example, a PSSCH may be replaced/substituted with a second SCI and/or a PSCCH, or vice versa, since a transmitting UE may transmit second SCI to a receiving UE through PSSCH.

Meanwhile, in various embodiments of the present disclosure, for example, if SCI configuration fields are divided into two groups in consideration of a (relatively) high SCI payload size, an SCI including a first SCI configuration field group may be referred to as a first SCI or a $1^{st}$ SCI, and an SCI including a second SCI configuration field group may be referred to as a second SCI or a $2^{nd}$ SCI. For example, the $1^{st}$ SCI and the $2^{nd}$ SCI may be transmitted through different channels. For example, the transmitting UE may transmit the first SCI to the receiving UE through the PSCCH. For example, the second SCI may be transmitted to the receiving UE through an (independent) PSCCH, or may be transmitted in a piggyback manner together with data through the PSSCH.

On the other hand, in various embodiments of the present disclosure, for example, "configuration" or "definition" may mean (resource pool specific) (pre-)configuration (through predefined signaling (e.g., SIB, MAC, RRC, etc.)) from a base station or a network.

Meanwhile, in various embodiments of the present disclosure, for example, since "RLF" may be interpreted as mutually extended to at least one of out of synch (OOS) and in synch (IS), "RLF" may be replaced/substituted with OOS of IS.

Meanwhile, in various embodiments of the present disclosure, for example, a resource block (RB) may be replaced/substituted with a subcarrier, or vice versa. For example, a packet or a traffic may be replaced/substituted with a transport block (TB) or a medium access control protocol data unit (MAC PDU) according to a transmission layer, or vice versa.

For example, a code block group (CBG) may be replaced/substituted with a TB, or vice versa.

For example, a source ID may be replaced/substituted with a destination ID, or vice versa. For example, an L1 ID may be replaced/substituted with an L2 ID, or vice versa. For example, the L1 ID may be an L1 source ID or an L1 destination ID. For example, the L2 ID may be an L2 source ID or an L2 destination ID.

Meanwhile, in various embodiments of the present disclosure, for example, operation(s) of a TX UE to reserve/select/determine retransmission resource(s) may include operation(s) of the TX UE to reserve/select/determine potential retransmission resource(s) in which actual use is determined based on SL HARQ feedback information received from RX UE(s).

Meanwhile, in various embodiments of the present disclosure, a sub-selection window may be replaced/substituted with a selection window and/or a pre-configured number of resource sets within the selection window, or vice versa.

Meanwhile, in various embodiments of the present disclosure, SL MODE 1 may refer to a resource allocation method or a communication method in which a base station directly schedules SL transmission resource(s) for a TX UE through pre-defined signaling (e.g., DCI or RRC message). For example, SL MODE 2 may refer to a resource allocation method or a communication method in which a UE independently selects SL transmission resource(s) in a resource pool pre-configured or configured from a base station or a network. For example, a UE performing SL communication based on SL MODE 1 may be referred to as a MODE 1 UE or MODE 1 TX UE, and a UE performing SL communication based on SL MODE 2 may be referred to as a MODE 2 UE or MODE 2 TX UE.

Meanwhile, in the present disclosure, for example, a dynamic grant (DG) may be replaced/substituted with a configured grant (CG) and/or a semi-persistent scheduling (SPS) grant, or vice versa. For example, the DG may be replaced/substituted with a combination of the CG and the SPS grant, or vice versa. For example, the CG may include at least one of a configured grant (CG) type 1 and/or a configured grant (CG) type 2. For example, in CG type 1, the grant may be provided by RRC signaling and may be stored as a configured grant. For example, in CG type 2, a grant may be provided by PDCCH, it may be stored or deleted as a configured grant based on L1 signaling indicating activation or deactivation of the grant.

Meanwhile, in various embodiments of the present disclosure, a channel may be replaced/substituted with a signal, or vice versa. For example, transmission/reception of a channel may include transmission/reception of a signal. For example, transmission/reception of a signal may include transmission/reception of a channel.

For example, cast may be replaced/substituted with at least one of unicast, groupcast, and/or broadcast, or vice versa. For example, a cast type may be replaced/substituted with at least one of unicast, groupcast, and/or broadcast, or vice versa.

Meanwhile, in various embodiments of the present disclosure, a resource may be replaced/substituted with a slot or a symbol, or vice versa. For example, the resource may include a slot and/or a symbol.

On the other hand, in various embodiments of the present disclosure, a priority may be replaced/substituted with logical channel priority (LCP), latency, reliability, minimum required communication range, prose per-packet priority (PPPP), sidelink radio bearer (SLRB), a QoS profile/parameter and/or a requirement.

On the other hand, in various embodiments of the present disclosure, a reservation resource and/or a selection resource may be mutually replaced/substituted with a sidelink grant.

On the other hand, in various embodiments of the present disclosure, latency may be replaced/substituted with a packet delay budget (PDB).

On the other hand, in various embodiments of the present disclosure, a message for triggering a report on sidelink channel state information/sidelink channel quality information (hereinafter, SL_CSI information) may be replaced/substituted with sidelink channel state information reference signal (CSI-RS) reception.

Meanwhile, in various embodiments of the present disclosure, blind retransmission may mean that a TX UE performs retransmission without receiving SL HARQ feedback information from an RX UE. For example, retransmission based on SL HARQ feedback may mean that a TX UE determines whether to perform retransmission based on SL HARQ feedback information received from an RX UE. For example, when a TX UE receives NACK and/or DTX information from an RX UE, a TX UE may perform retransmission to an RX UE.

Meanwhile, in various embodiments of the present disclosure, for example, for convenience of description, a (physical) channel used when a RX UE transmits at least one of the following information to a TX UE may be referred to as a PSFCH.

SL HARQ feedback, SL CSI, SL (L1) RSRP

Meanwhile, in various embodiments of the present disclosure, a Uu channel may include a UL channel and/or a DL channel. For example, a UL channel may include PUSCH, PUCCH, SRS, and the like. For example, the DL channel may include PDCCH, PDSCH, PSS/SSS, and the like. For example, an SL channel may include PSCCH, PSSCH, PSFCH, PSBCH, PSSS/SSSS, and the like.

Meanwhile, in various embodiments of the present disclosure, a sidelink information may include at least one of a sidelink message, a sidelink packet, a sidelink services, a sidelink data, sidelink control information, and/or a sidelink transport block (TB). For example, sidelink information may be transmitted through PSSCH and/or PSCCH.

Meanwhile, in NR V2X communication or NR sidelink communication, a transmitting UE may reserve/select one or more transmission resources for sidelink transmission (e.g., initial transmission and/or retransmission), and the transmitting UE may transmit information on the location of the one or more transmission resources to receiving UE(s).

Meanwhile, when performing sidelink communication, a method for a transmitting UE to reserve or pre-determine transmission resource(s) for receiving UE(s) may be representatively as follows.

For example, the transmitting UE may perform a reservation of transmission resource(s) based on a chain. Specifically, for example, if the transmitting UE reserves K transmission resources, the transmitting UE may transmit location information for less than K transmission resources to receiving UE(s) through a SCI transmitted to the receiving UE(s) at any (or specific) transmission time or a time resource. That is, for example, the SCI may include location information for less than the K transmission resources. Alternatively, for example, if the transmitting UE reserves K transmission resources related to a specific TB, the transmitting UE may transmit location information for less than K transmission resources to receiving UE(s) through a SCI transmitted to the receiving UE(s) at any (or specific) transmission time or a time resource. That is, the SCI may include location information for less than the K transmission resources. In this case, for example, it is possible to prevent performance degradation due to an excessive increase in payloads of the SCI, by signaling only the location information for less than K transmission resources to the receiving UE(s) through one SCI transmitted at any (or specific) transmission time or the time resource by the transmitting UE.

FIG. 12 shows a method in which a UE that has reserved transmission resource(s) informs another UE of the transmission resource(s), based on an embodiment of the present disclosure. The embodiment of FIG. 12 may be combined with various embodiments of the present disclosure.

Specifically, for example, (a) of FIG. 12 shows a method for performing by a transmitting UE chain-based resource reservation by transmitting/signaling location information of (maximum) 2 transmission resources to receiving UE(s) through one SCI, in the case of a value of K=4. For example, (b) of FIG. 12 shows a method for performing by a transmitting UE chain-based resource reservation by transmitting/signaling location information of (maximum) 3 transmission resources to receiving UE(s) through one SCI, in the case of a value of K=4. For example, referring to (a) and (b) of FIG. 12, the transmitting UE may transmit/signal only location information of the fourth transmission-related resource to the receiving UE(s) through the fourth (or last) transmission-related PSCCH. For example, referring to (a) of FIG. 12, the transmitting UE may transmit/signal to the receiving UE(s) not only location information of the fourth transmission-related resource but also location information of the third transmission-related resource additionally through the fourth (or last) transmission-related PSCCH. For example, referring to (b) of FIG. 12, the transmitting UE may transmit/signal to the receiving UE(s) not only location information of the fourth transmission-related resource but also location information of the second transmission-related resource and location information of the third transmission-related resource additionally through the fourth (or last) transmission-related PSCCH. In this case, for example, in (a) and (b) of FIG. 12, if the transmitting UE may transmit/signal to the receiving UE(s) only location information of the fourth transmission-related resource through the fourth (or last) transmission-related PSCCH, the transmitting UE may configure or designate a field/bit of location information of unused or remaining transmission resource(s) to a pre-configured value (e.g., 0). For example, in (a) and (b) of FIG. 12, if the transmitting UE may transmit/signal to the receiving UE(s) only location information of the fourth transmission-related resource through the fourth (or last) transmission-related PSCCH, the transmitting UE may be configured or designate a field/bit of location information of unused or remaining transmission resource(s) to a pre-configured status/bit value indicating/representing the last transmission (among 4 transmissions).

Meanwhile, for example, the transmitting UE may perform a reservation of transmission resource(s) based on a block. Specifically, for example, if the transmitting UE reserves K transmission resources, the transmitting UE may transmit location information for K transmission resources to receiving UE(s) through a SCI transmitted to the receiving UE(s) at any (or specific) transmission time or a time resource. That is, the SCI may include location information for K transmission resources. For example, if the transmitting UE reserves K transmission resources related to a specific TB, the transmitting UE may transmit location information for K transmission resources to receiving UE(s) through a SCI transmitted to the receiving UE(s) at any (or specific) transmission time or a time resource. That is, the SCI may include location information for K transmission resources. For example, (c) of FIG. 12 shows a method for performing by the transmitting UE block-based resource reservation, by signaling location information of 4 transmission resources to receiving UE(s) through one SCI, in the case of a value of K=4.

On the other hand, for example, in order to reduce the probability that some or all of resources for an initial transmission of a transmitting UE and resources for an initial transmission and/or retransmission of the other transmitting UE collide/overlap, according to the method described in Table 5, a UE may perform resource reservation.

TABLE 5

Support at least an initial transmission and reservation of the resource(s) for retransmission(s) to have the same number of sub-channels
To down-select in the early week of RAN1#99 one of the following:
  Alt. 1-1: Support a single sub-channel PSCCH + PSSCH reserving resource(s) for retransmission(s) of a TB with a larger number of sub-channels, where PSSCH REs are occupied by 2nd stage SCI and by SCH
    1 bit indication is carried in 1st stage SCI to distinguish the single sub-channel
    TBS is determined based on number of sub-channels indicated for reserved resource(s)
    RV is determined based on explicit field in 2nd stage SCI (as agreed)
  Alt. 1-2: Support a single sub-channel PSCCH + PSSCH reserving resource(s) for the TABLE 5-continued initial transmission and possibly retransmission(s) of a TB with a larger number of
sub-channels, where all available PSSCH REs in the single sub-channel
PSCCH + PSSCH are occupied only by 2nd stage SCI
    1st stage SCI indicates that PSSCH REs are occupied by 2nd stage SCI
Alt. 2: Do not support the different number of sub-channels between initial
transmission and reservation of resource(s) for retransmission(s)
    Alt 1 is not supported in this case
Companies are encouraged to provide more analysis and evaluations for the above 3
alternatives Referring to Table 5, a resource for a UE to perform initial transmission and a resource reserved for retransmission by a UE may have the same number of subchannels. For example, according to Alt. 1-1, a UE may reserve a resource for retransmission of a TB through a larger number of subchannels by using a single subchannel reservation resource (e.g., PSCCH and PSSCH). Here, for example, PSSCH RE may be occupied by $2^{nd}$ SCI and SCH. For example, according to Alt. 1-2, a UE may use a single subchannel reservation resource (e.g., PSCCH and PSSCH) to reserve a resource for initial transmission and the possibility of retransmission of a TB through a larger number of subchannels. Here, for example, all available PSSCH REs in a single subchannel may be occupied by only the $2^{nd}$ SCI. For example, according to Alt 2, a UE must reserve a resource for retransmission equal to the number of subchannels of a resource for performing initial transmission.

On the other hand, for example, before a transmission UE reserves/selects a resource, and the transmission UE transmits SL information using the reserved/selected resource, the transmitting UE may perform an operation according to the method described in Table 6, in order for the transmitting UE to check/determine whether a resource reserved/selected by itself collides with/overlapping some or all of a resource reserved/selected by another UE.

Referring to Table 6, before a transmitting UE transmits SCI using a reserved/selected resource, the transmitting UE may re-evaluate the identification of candidate resources in a resource selection window and the selection of resources for (re)transmission among the identified candidate resources. For example, in a resource (re)selection procedure, it is assumed that a transmitting UE identifies a candidate resource in a resource selection window, and selects a first resource for (re)transmission from among the identified candidate resources. In this case, before the transmitting UE transmits SCI using a first resource, the transmitting UE may re-evaluate the resource (re)selection procedure.

For example, for a given time instance n at which a resource (re)selection and reevaluation procedure is triggered, a resource selection window may start at time instance (n+T1) and end at time instance (n+T2). Here, for example, it may be T1≥0. For example, for a given time instance n at which a resource (re)selection and reevaluation procedure is triggered, a sensing window may be defined as a time interval [n−T0, n−$T_{proc,0}$]. For example, T0 may be configured for a UE or may be pre-configured. For example, a UE may receive information related to T0 from a network/base station. For example, it may be T0>$T_{proc,0}$.

TABLE 6

Resource (re-)selection procedure supports re-evaluation of Step 1 and Step 2 before
transmission of SCI with reservation
    The re-evaluation of the (re-)selection procedure for a resource reservation signalled
    in a moment 'm' is not required to be triggered at moment > 'm − T3' (i.e. resource
    reselection processing time needs to be ensured)
    FFS condition to change resource(s) from previous iteration to resource(s) from
    current iteration
    FFS relationship of T1 and T3, if any
    FFS whether to handle it differently for blind and feedback-based retransmission
    resources
For a given time instance n when resource (re-)selection and re-evaluation procedure is
triggered
    The resource selection window starts at time instance (n + T1), T1 ≥ 0 and ends at
    time instance (n + T2)
        The start of selection window T1 is up to UE implementation subject to T1 ≤
        $T_{proc,1}$
        T2 is up to UE implementation with the following details as a working
        assumption:
            T2 ≥ $T2_{min}$
            If $T2_{min}$ > Remaining PDB, then $T2_{min}$ is modified to be equal to
            Remaining PDB
            FFS other details of $T2_{min}$ including whether the minimum window
            duration $T2_{min}$ − T1 is a function of priority
        UE selection of T2 shall fulfil the latency requirement, i.e. T2 ≤ Remaining
        PDB
    A sensing window is defined by time interval [n − T0, n − $T_{proc,0}$)
        T0 is (pre-)configured, T0 > $T_{proc,0}$ FFS further details
    FFS, if $T_{proc,0}$ and $T_{proc,1}$ are defined separately or as a sum
    FFS relation of T3, $T_{proc,0}$, $T_{proc,1}$
    Time instances n, T0, T1, T2, $T2_{min}$ are measured in slots, FFS $T_{proc,0}$ and $T_{proc,1}$
A UE is expected to select resources for all intended (re-)transmissions within the PDB, i.e.
the number of intended (re-)transmissions is an input to the resource (re-)selection
procedure For example, a UE may select a resource for all intended (re)transmission within a Packet Delay Budget (PDB). For example, a UE may perform resource reselection based on the number of intended (re)transmissions.

For example, a transmission UE may be configured to select/reserve resources for transmission of the same or different TBs according to some or all of the rules below. For example, a transmitting UE may select/reserve resources for transmission of the same or different TBs according to some or all of the rules below. Here, for example, a period value and/or a time gap value that a transmitting UE transmits/signals through a pre-configured field (hereinafter, TG_FD) on SCI (e.g., options 1-a and/or 1-b in Table 7) may be pre-configured/limited by a base station/network. For example, a period value and/or a time gap value that a resource is out of the range of W value, a transmitting UE may transmit different SL information (e.g., packet, message, or TB) using the specific resource. For example, among selection/reservation resources that a transmitting UE transmits/signals to a receiving UE through one SCI within $N_{MAX}$ value, when the timing of a specific resource is out of the range of W value, a transmitting UE may transmit different SL information (e.g., packet, message, or TB) using the specific resource. For example, a transmitting UE may transmit first SL information using a resource within the range of W value, a transmitting UE may transmit second SL information by using a resource outside the range of W value. For example, $N_{MAX}$ may be the maximum number of resources that a transmitting UE can transmit/signal through one SCI.

TABLE 7

When reservation of a sidelink resource for an initial transmission of a TB at least by an SCI associated with a different TB is disabled, $N_{MAX}$ is 3
   SCI signaling designed to allow to indicate 1 or 2 or 3 resources at least of the same number of sub-channels with full flexibility in time and frequency position in a window W of a resource pool
     FFS: if full flexibility is limited in some cases
   Value 2 or 3 is (pre-)configured per resource pool
   FFS size of window W
When reservation of a sidelink resource for an initial transmission of a TB at least by an SCI associated with a different TB is enabled, select in RAN1#99 from the following:
   Option 1-a. A period > W is additionally signaled in SCI and the same reservation is applied with respect to resources indicated within $N_{MAX}$ within window W at subsequent periods
     FFS number of subsequent reservation periods
     FFS $N_{MAX}$ is always same regardless if a period > W is additionally signaled or not for SCI size perspective.
   Option 1-b. A time gap > W is additionally signaled in SCI and the same reservation is applied with respect to resources indicated within $N_{MAX}$ within window W at resources indicated by the time gap
     FFS $N_{MAX}$ is always same regardless if a time gap > W is additionally signaled or not for SCI size perspective.
   Option 2. There is no additional field (NDI and HARQ ID are used at the moment of SCI reception) to distinguish reservation for another TB, and at least one of NMAX resources can be signaled beyond window W transmitting UE transmits/signals through TG_FD on SCI may be pre-configured/limited by a base station/network per pool. For convenience of description, a period value and/or a time interval value transmitted/signaled by a transmitting UE through TG_FD may be referred to as TG_VAL.

For example, a transmitting UE may transmit a plurality of pre-configured TG_VAL related index information through TG_FD. And/or, for example, a TG_VAL linked for each TG_FD related status may be pre-configured. For example, the relationship between the TG_FD related state and TG_VAL may be pre-configured. For example, a specific TG_FD related state and a specific TG_VAL may be correlated.

For example, in some or all of the rules below, the window (W) value may be a PDB or a remaining PDB. And/or, for example, W value may be a time interval that a UE can buffer. For example, W value may be the maximum time interval that a UE can buffer for HARQ combining operation. Here, for example, among selection/reservation resources that a transmitting UE transmits/signals to a receiving UE through SCI, when the timing of a specific Referring to Table 7, when reservation of an SL resource for initial transmission of a TB by SCI related to another TB is deactivated, $N_{MAX}$ may be 3. For example, when it is deactivated that a transmitting UE performs resource reservation for initial transmission of a second SL using SCI related to first SL information, the transmitting UE may transmit information on up to three resources by using one SCI.

For example, when reservation of an SL resource for initial transmission of a TB by SCI related to another TB is activated, various options may exist. For example, when a transmission UE is activated to perform resource reservation for the initial transmission of second SL using SCI related to first SL information, various options may exist.

For example, according to option 1-a, a transmitting UE may transmit/signal 'PERIOD>W' through SCI. For example, according to option 1-b, a transmitting UE may transmit/signal 'TIME GAP>W' through SCI. For example, according to option 2, an additional field for distinguishing reservations for other TBs (NDI and HARQ ID are used at the time of SCI reception) may not exist on SCI.

Meanwhile, according to an embodiment of the present disclosure, a sidelink channel occupancy ratio (CR) may be defined as shown in Table 8 below.

TABLE 8

Sidelink channel occupancy ratio (SL CR)

| | |
|---|---|
| Definition | Sidelink Channel Occupancy Ratio (SL CR) evaluated at slot n is defined as the total number of sub-channels used for its transmissions in slots [n − a, n − 1] and granted in slots [n, n + b] divided by the total number of configured sub-channels in the transmission pool over (n − a, n + b]. |
| Applicable for | RRC_IDLE intra-frequency, RRC_IDLE inter-frequency, RRC_CONNECTED intra-frequency, RRC_CONNECTED inter-frequency |

NOTE 1:
a is a positive integer and b is TBD; a and b are determined by UE implementation with a + b + 1 = TBD, a >= TBD, and n + b should not exceed the last transmission opportunity of the grant for the current transmission.
NOTE 2:
SL CR is evaluated for each (re)transmission.
NOTE 3:
In evaluating SL CR, the UE shall assume the transmission parameter used at slot n is reused according to the existing grant(s) in slot [n + 1, n + b] without packet dropping.
[NOTE 4:
The slot index is based on physical slot index.]
NOTE 5:
SL CR can be computed per priority level Here, for example, when congestion control is configured or applied, a UE may configure a maximum SL CR limit for each priority related to a CBR measurement value and/or a service/packet. For example, a UE may configure the maximum allowed SL CR limit based on a CBR measurement value and/or a priority related to a service/packet.

Also, for example, a transmitting UE may reserve a plurality of potential (re)transmission resources, considering the possibility of performing retransmission based on received HARQ feedback information and the probability that a transmission resource of the transmitting UE collides with a transmission resource of another UE. For example, a transmitting UE may determine the possibility of performing retransmission related to HARQ feedback information and the probability that a transmission resource of the transmitting UE collides with a transmission resource of another UE. For example, a transmitting UE may reserve a plurality of potential (re)transmission resources based on the possibility of performing a retransmission and the collision probability. Here, for example, a transmitting UE may receive HARQ-ACK information from a receiving UE, for efficient use/sharing of resources, the transmitting UE may release remaining potential retransmission resources or may not use the remaining potential retransmission resources. For example, the following rule suggests a method for a transmitting UE to calculate CR based on a released retransmission resource.

For example, a UE may specifically and differently configure whether to apply some rules or all rules of the present disclosure, based on chain/block-based resource reservation operation and/or blind retransmission/sidelink HARQ feedback-based retransmission operation and/or configured grant/dynamic grant-based resource selection/reservation operation and/or resource pool and/or or service type/class and/or service priority and/or cast type (e.g., unicast, groupcast, broadcast) and/or destination UE and/or L1 source ID or L1 destination (destination) ID/L2 source ID or L2 destination ID and/or service QoS parameters (e.g., reliability, delay, (target) BLER) and/or congestion level or resource pool congestion level and/or mode type (e.g., For example, mode 1/mode 2) and/or grant type/class (e.g., configured grant, dynamic grant) and/or packet/message (e.g., TB) size and/or the number of subchannels used for PSSCH transmission and/or the number of RBs related to PSCCH transmission and/or the number of RBs constituting the subchannel and/or the number of subchannels and/or RBs constituting the resource pool and/or whether the size of the subchannel and the PSCCH resource size are the same and/or whether it is aperiodic traffic or whether it is periodic traffic. And/or, for example, a UE may specifically and differently configure parameters related to whether some rules or all rules of the present disclosure are applied, based on chain/block-based resource reservation operation and/or blind retransmission/sidelink HARQ feedback-based retransmission operation and/or configured grant/dynamic grant-based resource selection/reservation operation and/or resource pool and/or or service type/class and/or service priority and/or cast type (e.g., unicast, groupcast, broadcast) and/or destination UE and/or L1 source ID or L1 destination (destination) ID/L2 source ID or L2 destination ID and/or service QoS parameters (e.g., reliability, delay, (target) BLER) and/or congestion level or resource pool congestion level and/or mode type (e.g., For example, mode 1/mode 2) and/or grant type/class (e.g., configured grant, dynamic grant) and/or packet/message (e.g., TB) size and/or the number of subchannels used for PSSCH transmission and/or the number of RBs related to PSCCH transmission and/or the number of RBs constituting the subchannel and/or the number of subchannels and/or RBs constituting the resource pool and/or whether the size of the subchannel and the PSCCH resource size are the same and/or whether it is aperiodic traffic or whether it is periodic traffic.

For example, since a transmitting UE will release or not use remaining potential (re)transmission resources, a transmitting UE may exclude the number of subchannels related to remaining potential (re)transmission resources from CR calculation, and/or may multiply the number of the related subchannels by a pre-configured weight and reflect it in the CR calculation. For example, a transmitting UE may determine CR based on the number of subchannels related to remaining potential (re)transmission resources. For example, a transmitting UE may determine CR based on the number of subchannels related to remaining potential (re) transmission resources. For example, a transmitting UE may configure a real value less than 1 as a weight value, in order to lower the ratio reflected in CR calculation compared to the case where the transmitting UE actually transmits and/or does not release a reserved/selected resource.

For example, when CR calculation is performed by a transmitting UE at slot N time point, the transmitting UE may configure not to consider a reserved/selected resource after the slot N time point, and/or the transmitting UE may configure whether to consider the reserved/selected resource within a pre-configured time window after the slot N time point. For example, for aperiodic traffic/packet transmission, a transmitting UE may configure not to consider a reserved/selected resource after the slot N time point, and/or the transmitting UE may configure whether to consider the reserved/selected resource within a pre-configured time window after the slot N time point.

For example, when CR calculation is triggered to a transmitting UE at the slot N time, the transmitting UE may configure not to consider a reserved/selected resource after the slot N time point, and/or the transmitting UE may configure whether to consider the reserved/selected resource within a pre-configured time window after the slot N time point. For example, for aperiodic traffic/packet transmission, a transmitting UE may configure not to consider a reserved/selected resource after the slot N time point, and/or the transmitting UE may configure whether to consider the reserved/selected resource within a pre-configured time window after the slot N time point.

Figure 13:
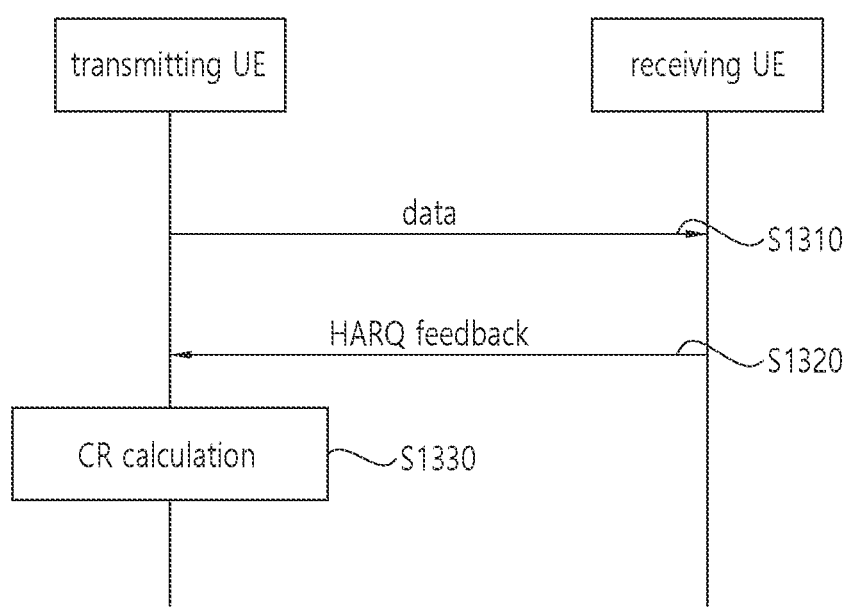
FIG. 13 shows a method for a transmitting UE to calculate a CR, according to an embodiment of the present disclosure.

FIG. 13 shows a method for a transmitting UE to calculate CR, according to an embodiment of the present disclosure. FIG. 13 may be combined with various embodiments of the present disclosure.

Referring to FIG. 13, in step S1310, a transmitting UE may transmit data to a receiving UE through a PSSCH. For example, a transmitting UE may aperiodically transmit the data to a receiving UE through the PSSCH.

In step S1320, a transmitting UE may receive HARQ feedback related to data from a receiving UE through a PSFCH. For example, a transmission resource related to the data after receiving a HARQ feedback may be released.

In step S1330, a transmitting UE may calculate CR for a transmission resource related to the data in a first slot. For example, calculation of CR for a transmission resource related to the data may be triggered in a first slot. For example, a transmission resource related to the data released after a first slot may not be considered for CR. For example, a transmitting UE may exclude a transmission resource related to the released data from calculation for CR. For example, in CR, the number of subchannels related to the data may not be considered. For example, a transmitting UE may exclude the number of subchannels related to the data from calculation of CR. For example, a transmission resource related to the data released before a first slot after receiving a HARQ feedback related to the data may not be considered in the CR. For example, a transmitting UE may exclude the data-related transmission resource released before a first slot after receiving the data-related HARQ feedback from calculation for the CR.

For example, based on that a congestion control is configured, a CR limit value related to the CR may be configured. For example, a CR limit value may be configured based on at least one of a channel busy ratio (CBR) measurement value or a service-related priority.

For example, CR may be a value which is a sum of the number of subchannels used from a second slot to a third slot and the number of subchannels granted from a first time point to a fourth slot, divided by the total number of subchannels configured in a transmission pool from the second slot to the fourth slot. Here, the second slot and the third slot may precede the first slot. Here, the fourth slot may follow the first slot. For example, the first slot, the second slot, the third slot, and the fourth slot may be determined based on a physical slot index. For example, the CR may be evaluated for each transmission related to the data.

For example, based on that the transmission resource related to the data, located after receiving the HARQ feedback is not released, a transmitting UE may apply a pre-configured weight value to the CR for the transmission resource related to the data. Here, for example, the pre-configured weight value may be a positive real value less than 1. For example, the pre-configured weight value may be applied to the number of subchannels related to the data For example, a transmission resource related to the data within a pre-configured time domain after the first slot may be considered for the CR.

Figure 14:
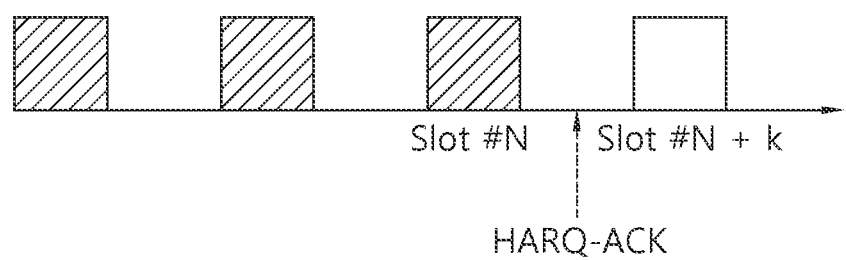
FIG. 14 shows an example of calculating a CR by excluding resources released after a transmitting UE receives an HARQ-ACK, according to an embodiment of the present disclosure.

FIG. 14 shows an example of calculating CR by excluding resources released after a transmitting UE receives an HARQ-ACK, according to an embodiment of the present disclosure. FIG. 14 may be combined with various embodiments of the present disclosure.

Referring to FIG. 14, a transmitting UE may transmit a PSSCH to a receiving UE in Slot #N. For example, a transmitting UE may transmit data to a receiving UE in Slot #N through PSSCH. That is, for example, Slot #N may be a time point at which a transmitting UE transmits a PSSCH to a receiving UE. For example, Slot #N may be a time when a transmitting UE transmits data to a receiving UE through PSSCH. A transmitting UE may receive a PSFCH related to a PSSCH from a receiving UE. For example, a transmitting UE may receive a HARQ-ACK related to data from a receiving UE through PSFCH. In this case, after receiving HARQ-ACK, a transmission resource related to the data may be released. For example, a transmitting UE may not be able to use a transmission resource related to the data after receiving HARQ-ACK. A transmitting UE may calculate CR related to the data in Slot #N+k. For example, a transmitting UE may be triggered to calculate CR related to the data in Slot #N+k. That is, for example, Slot #N+k may be a time point at which a transmitting UE calculates CR. That is, for example, Slot #N+k may be a time at which a transmitting UE is triggered to calculate CR. For example, a transmitting UE may exclude resources released after Slot #N+k from CR calculation. For example, a transmitting UE may exclude a released resource from CR calculation after receiving HARQ-ACK.

For example, a transmitting UE may not reflect a retransmission resource released based on ACK reception, which exists after the time of calculating CR, in the corresponding CR calculation. For example, a transmitting UE may not regard it as an granted resource of a sidelink grant. That is, by a UE excluding unused or released resources from CR calculation, congestion control can be efficiently operated.

For example, in CR calculation, if a resource is included in a selected sidelink grant, the resource may be considered granted. For example, if a sidelink grant selected for retransmission of a MAC PDU confirmed with ACK is available, a PSCCH duration and PSSCH duration corresponding to the retransmission of the MAC PDU from the selected sidelink grant may be excluded. That is, for example, a MAC entity, when a sidelink grant selected for retransmission of a MAC PDU confirmed as ACK is available, may clear a PSCCH duration and PSSCH duration corresponding to a retransmission of a MAC PDU from a selected sidelink grant.

Figure 15:
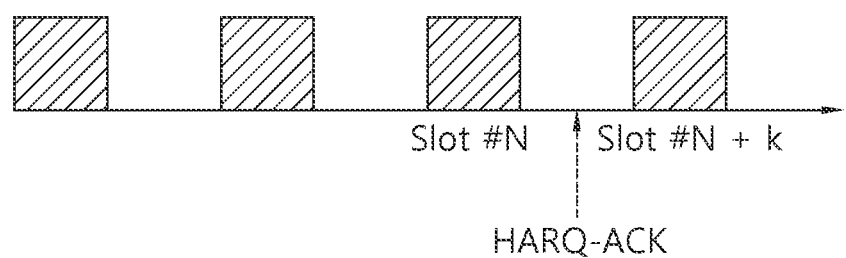
FIG. 15 shows an example of calculating a CR by considering a resource released after a transmitting UE receives a HARQ-ACK according to an embodiment of the present disclosure.

FIG. 15 shows an example of calculating CR by considering a resource released after a transmitting UE receives a HARQ-ACK according to an embodiment of the present disclosure. FIG. 15 may be combined with various embodiments of the present disclosure.

Referring to FIG. 15, a transmitting UE may transmit a PSSCH to a receiving UE in Slot #N. For example, a transmitting UE may transmit data to a receiving UE in Slot #N through PSSCH. That is, for example, Slot #N may be a time point at which a transmitting UE transmits a PSSCH to a receiving UE. For example, Slot #N may be a time when a transmitting UE transmits data to a receiving UE through PSSCH. A transmitting UE may receive a PSFCH related to a PSSCH from a receiving UE. For example, a transmitting UE may receive HARQ-ACK related to data from a receiving UE through PSFCH. In this case, after receiving HARQ-ACK, a transmission resource related to the data may be released. A transmitting UE may calculate CR related to the data in Slot #N+k. For example, a transmitting UE may be triggered to calculate CR related to the data in Slot #N+k. That is, for example, Slot #N+k may be a time point at which a transmitting UE calculates CR. That is, for example, Slot #N+k may be a time at which a transmitting UE is triggered to calculate CR. For example, a transmitting UE may not exclude a resource released after Slot #N+k from CR calculation. For example, a transmitting UE may not exclude a released resource from CR calculation after receiving HARQ-ACK. For example, a transmitting UE may reflect a pre-configured weight value in CR calculation. For example, a transmitting UE may reflect CR calculation by multiplying the number of subchannels related to a released resource by a pre-configured weight value. For example, a pre-configured weight value may be a positive real number less than one.

Figure 16:
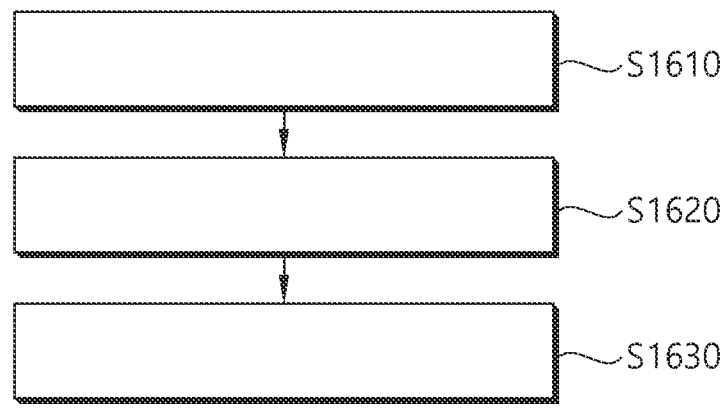
FIG. 16 shows a method for a first apparatus to obtain a CR based on HARQ feedback received from a second apparatus, according to an embodiment of the present disclosure.

FIG. 16 shows a method for a first apparatus to obtain CR based on HARQ feedback received from a second apparatus, according to an embodiment of the present disclosure. The embodiment of FIG. 16 may be combined with various embodiments of the present disclosure.

Referring to FIG. 16, in step S1610, a first apparatus 100 may transmit a data to a second apparatus 200 through physical sidelink shared channel (PSSCH). For example, the data may be transmitted aperiodically.

In step S1620, a first apparatus 100 may receive a hybrid automatic repeat request (HARQ) feedback related to the data from the second apparatus 200 through physical sidelink feedback channel (PSFCH). For example, a transmission resource related to the data, located after receiving the HARQ feedback, may be released.

In step S1630, a first apparatus 100 may obtain channel occupancy ratio (CR) for a transmission resource related to the data on a first slot. For example, calculation of the CR for the transmission resource related to the data may be triggered in the first slot. For example, a transmission resource related to the data released after the first slot may be not considered in the CR. For example, a transmission resource related to the data released before the first slot after receiving the HARQ feedback may be not considered in the CR.

For example, the CR may be a value which is a sum of a number of subchannels used from a second slot to a third slot and a number of subchannels granted from a first time point to a fourth slot, divided by a total number of subchannels configured in a transmission pool from the second slot to the fourth slot. For example, the second slot and the third slot may precede the first slot. For example, the fourth slot may follow the first slot. For example, the CR may be evaluated for each transmission related to the data. For example, the first slot, the second slot, the third slot, and the fourth slot may be based on a physical slot index. For example, a number of subchannels related to the data may be not considered in the CR.

For example, a CR limit value related to the CR may be configured, based on that congestion control is configured.

For example, the CR limit value may be configured based on at least one of a channel busy ratio (CBR) measurement value or a priority related to a service.

For example, HARQ a pre-configured weight value may be applied to the CR for the transmission resource related to the data, based on that the transmission resource related to the data, located after receiving the HARQ feedback is not released. For example, the pre-configured weight value may be a positive real value less than 1. For example, the pre-configured weight value may be applied to a number of subchannels related to the data. For example, a transmission resource related to the data within a pre-configured time domain after the first slot may be considered for the CR.

The above-described embodiment may be applied to various apparatuses to be described below. For example, a processor 102 of a first apparatus 100 may control a transceiver 106 to transmit a data to a second apparatus 200 through physical sidelink shared channel (PSSCH). And, a processor 102 of a first apparatus 100 may control a transceiver 106 to receive a hybrid automatic repeat request (HARQ) feedback related to the data from the second apparatus 200 through physical sidelink feedback channel (PSFCH). And, a processor 102 of a first apparatus 100 may obtain channel occupancy ratio (CR) for a transmission resource related to the data on a first slot.

According to an embodiment of the present disclosure, a first apparatus for performing wireless communication may be proposed. For example, the first apparatus may comprise: one or more memories storing instructions; one or more transceivers; and one or more processors connected to the one or more memories and the one or more transceivers. For example, the one or more processors may execute the instructions to: transmit a data to a second apparatus through physical sidelink shared channel (PSSCH); receive a hybrid automatic repeat request (HARQ) feedback related to the data from the second apparatus through physical sidelink feedback channel (PSFCH); and obtain channel occupancy ratio (CR) for a transmission resource related to the data on a first slot, wherein a transmission resource related to the data, located after receiving the HARQ feedback, is released, and wherein a transmission resource related to the data released after the first slot is not considered in the CR.

According to an embodiment of the present disclosure, an apparatus configured to control a first user equipment (UE) may be proposed. For example, the apparatus may comprise: one or more processors; and one or more memories operably connectable to the one or more processors and storing instructions. For example, the one or more processors may execute the instructions to: transmit a data to a second UE through physical sidelink shared channel (PSSCH); receive a hybrid automatic repeat request (HARQ) feedback related to the data from the second UE through physical sidelink feedback channel (PSFCH); and obtain channel occupancy ratio (CR) for a transmission resource related to the data on a first slot, wherein a transmission resource related to the data, located after receiving the HARQ feedback, is released, and wherein a transmission resource related to the data released after the first slot is not considered in the CR.

According to an embodiment of the present disclosure, a non-transitory computer-readable storage medium storing instructions may be proposed. For example, the instructions, when executed, may cause a first apparatus to: transmit a data to a second apparatus through physical sidelink shared channel (PSSCH); receive a hybrid automatic repeat request (HARQ) feedback related to the data from the second apparatus through physical sidelink feedback channel (PSFCH); and obtain channel occupancy ratio (CR) for a transmission resource related to the data on a first slot, wherein a transmission resource related to the data, located after receiving the HARQ feedback, is released, and wherein a transmission resource related to the data released after the first slot is not considered in the CR.

Figure 17:
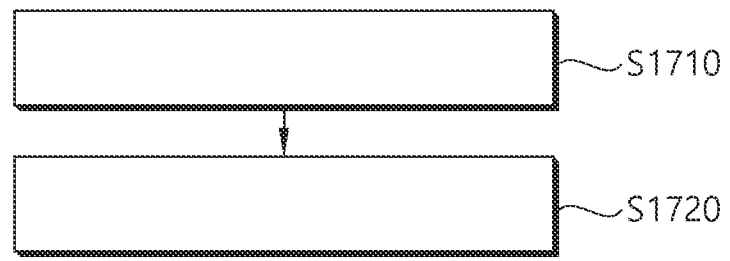
FIG. 17 shows a method for obtaining a CR based on HARQ feedback transmitted from a second apparatus to a first apparatus, according to an embodiment of the present disclosure.

FIG. 17 shows a method for obtaining CR based on HARQ feedback transmitted from a second apparatus to a first apparatus, according to an embodiment of the present disclosure. The embodiment of FIG. 17 may be combined with various embodiments of the present disclosure.

Referring to FIG. 17, in step S1710, a second apparatus 200 may receive a data from a first apparatus 100 through physical sidelink shared channel (PSSCH).

In step S1720, a second apparatus 200 may transmit a hybrid automatic repeat request (HARQ) feedback related to the data to the first apparatus 100 through physical sidelink feedback channel (PSFCH). For example, channel occupancy ratio (CR) for a transmission resource related to the data may be obtained on a first slot. For example, calculation of the CR for the transmission resource related to the data may be triggered in the first slot. For example, a transmission resource related to the data released after the first slot may be not considered in the CR. For example, a transmission resource related to the data released before the first slot after receiving the HARQ feedback may be not considered in the CR.

For example, the CR may be a value which is a sum of a number of subchannels used from a second slot to a third slot and a number of subchannels granted from a first time point to a fourth slot, divided by a total number of subchannels configured in a transmission pool from the second slot to the fourth slot. For example, the second slot and the third slot may precede the first slot. For example, the fourth slot may follow the first slot. For example, the CR may be evaluated for each transmission related to the data. For example, the first slot, the second slot, the third slot, and the fourth slot may be based on a physical slot index. For example, a number of subchannels related to the data may be not considered in the CR.

For example, a CR limit value related to the CR may be configured, based on that congestion control is configured. For example, the CR limit value may be configured based on at least one of a channel busy ratio (CBR) measurement value or a priority related to a service.

For example, HARQ a pre-configured weight value may be applied to the CR for the transmission resource related to the data, based on that the transmission resource related to the data, located after receiving the HARQ feedback is not released. For example, the pre-configured weight value may be a positive real value less than 1. For example, the pre-configured weight value may be applied to a number of subchannels related to the data. For example, a transmission resource related to the data within a pre-configured time domain after the first slot may be considered for the CR.

The above-described embodiment may be applied to various apparatuses to be described below. For example, a processor 202 of a second apparatus 200 may control a transceiver 206 to receive a data from a first apparatus 100 through physical sidelink shared channel (PSSCH). And, a processor 202 of a second apparatus 200 may control a transceiver 206 to transmit a hybrid automatic repeat request (HARQ) feedback related to the data to the first apparatus 100 through physical sidelink feedback channel (PSFCH).

According to an embodiment of the present disclosure, A second apparatus for performing wireless communication may be proposed. For example, the second apparatus may comprise: one or more memories storing instructions; one or more transceivers; and one or more processors connected to the one or more memories and the one or more transceivers. For example, the one or more processors may execute the instructions to: receive a data from a first apparatus through physical sidelink shared channel (PSSCH); and transmit a hybrid automatic repeat request (HARQ) feedback related to the data to the first apparatus through physical sidelink feedback channel (PSFCH), wherein channel occupancy ratio (CR) for a transmission resource related to the data is obtained on a first slot, wherein a transmission resource related to the data, located after receiving the HARQ feedback, is released, and wherein a transmission resource related to the data released after the first slot is not considered in the CR.

Hereinafter, an apparatus to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 18:
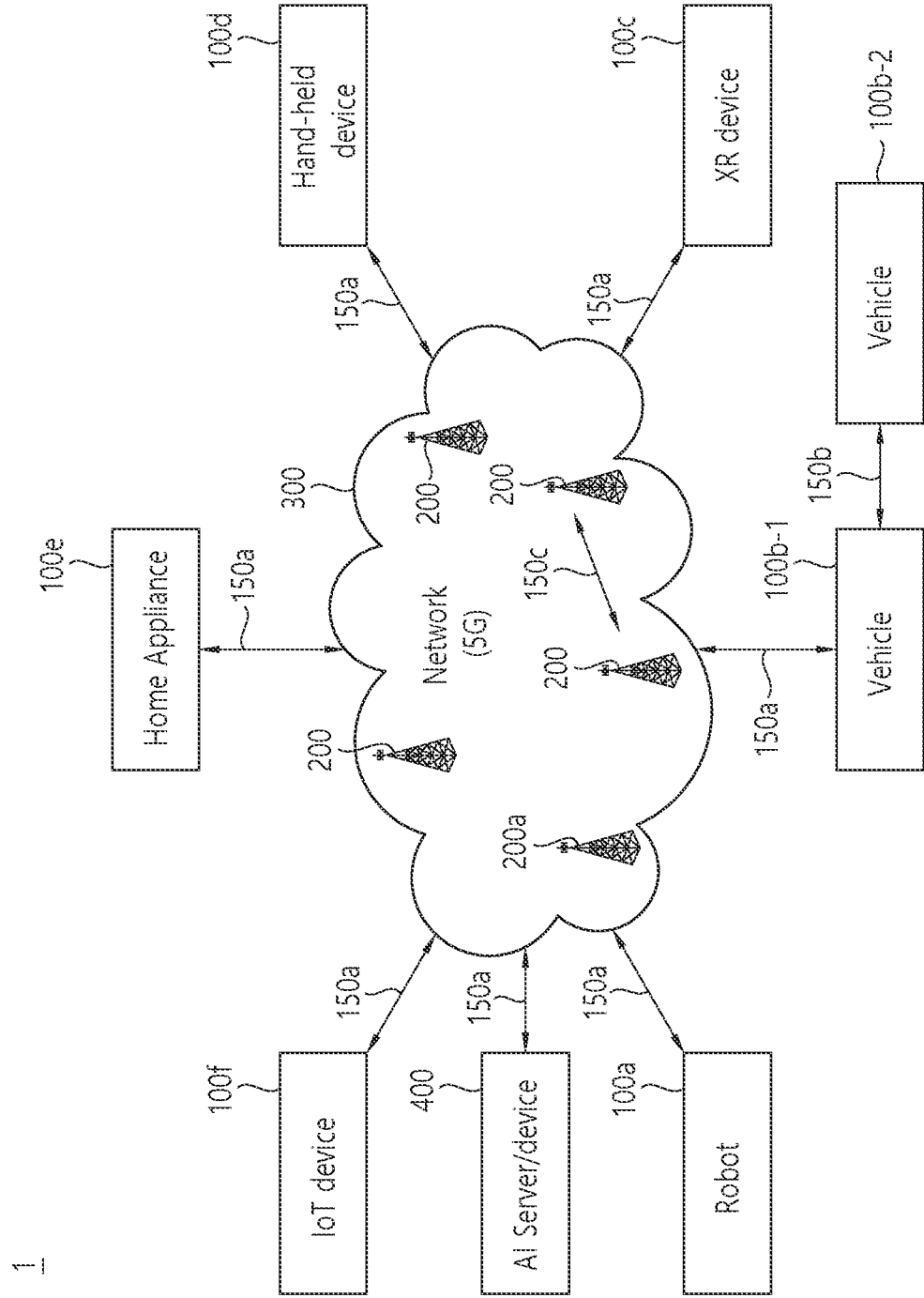
FIG. 18 shows a communication system 1, in accordance with an embodiment of the present disclosure.

FIG. 18 shows a communication system 1, in accordance with an embodiment of the present disclosure.

Referring to FIG. 18, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

Here, wireless communication technology implemented in wireless devices 100a to 100f of the present disclosure may include Narrowband Internet of Things for low-power communication in addition to LTE, NR, and 6G. In this case, for example, NB-IoT technology may be an example of Low Power Wide Area Network (LPWAN) technology and may be implemented as standards such as LTE Cat NB1, and/or LTE Cat NB2, and is not limited to the name described above. Additionally or alternatively, the wireless communication technology implemented in the wireless devices 100a to 100f of the present disclosure may perform communication based on LTE-M technology. In this case, as an example, the LTE-M technology may be an example of the LPWAN and may be called by various names including enhanced Machine Type Communication (eMTC), and the like. For example, the LTE-M technology may be implemented as at least any one of various standards such as 1) LTE CAT 0, 2) LTE Cat M1, 3) LTE Cat M2, 4) LTE non-Bandwidth Limited (non-BL), 5) LTE-MTC, 6) LTE Machine Type Communication, and/or 7) LTE M, and is not limited to the name described above. Additionally or alternatively, the wireless communication technology implemented in the wireless devices 100a to 100f of the present disclosure may include at least one of Bluetooth, Low Power Wide Area Network (LPWAN), and ZigBee considering the low-power communication, and is not limited to the name described above. As an example, the ZigBee technology may generate personal area networks (PAN) related to small/low-power digital communication based on various standards including IEEE 802.15.4, and the like, and may be called by various names.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 19:
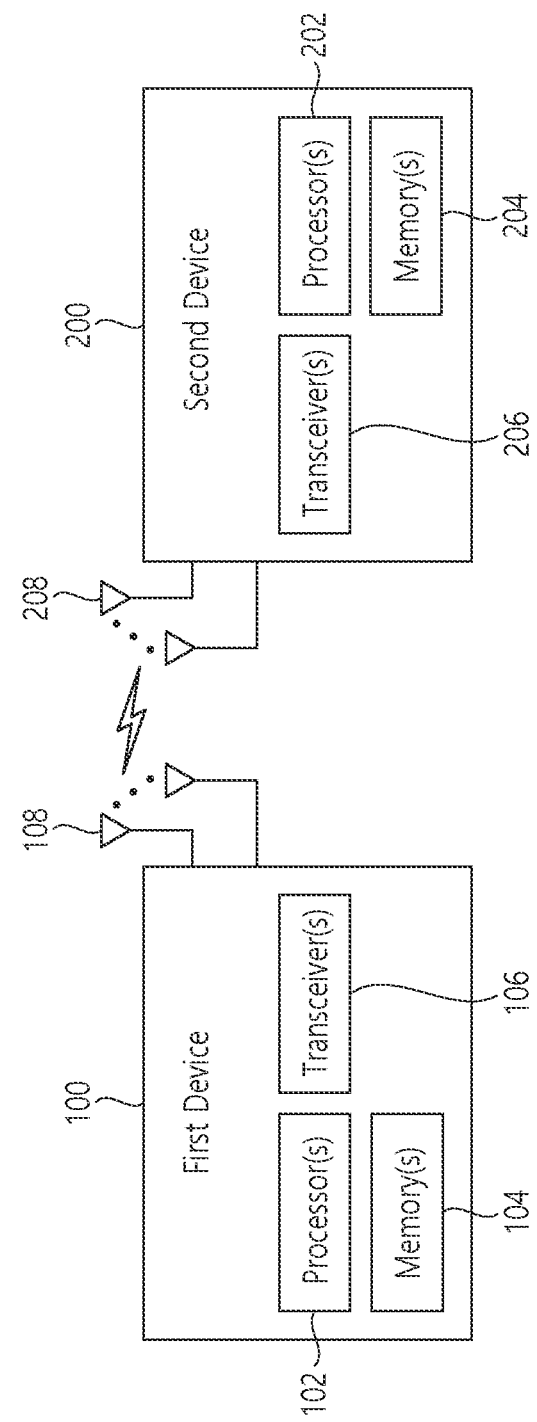
FIG. 19 shows wireless devices, in accordance with an embodiment of the present disclosure.

FIG. 19 shows wireless devices, in accordance with an embodiment of the present disclosure.

Referring to FIG. 19, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 18.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 20:
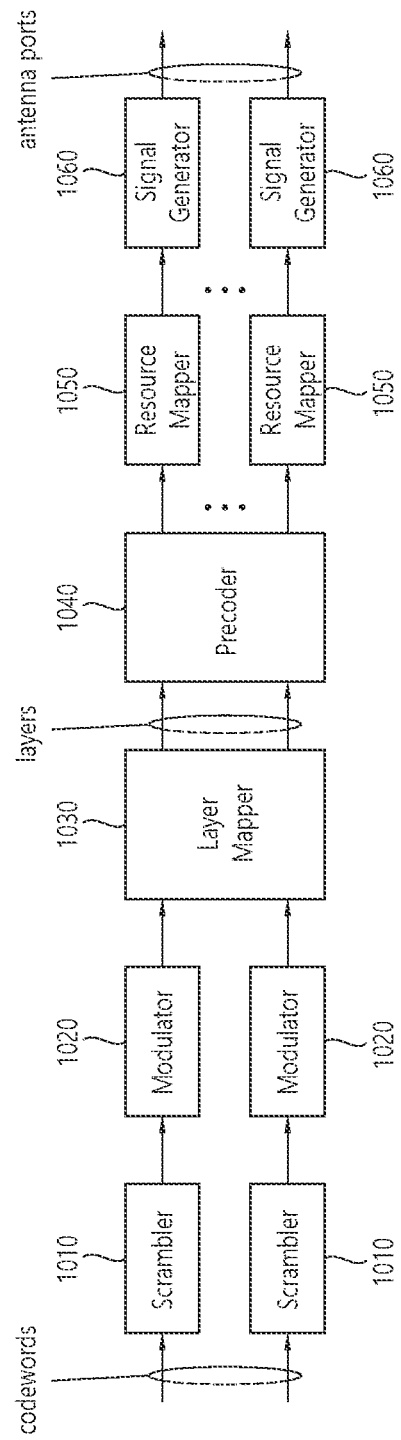
FIG. 20 shows a signal process circuit for a transmission signal, in accordance with an embodiment of the present disclosure.

FIG. 20 shows a signal process circuit for a transmission signal, in accordance with an embodiment of the present disclosure.

Referring to FIG. 20, a signal processing circuit 1000 may include scramblers 1010, modulators 1020, a layer mapper 1030, a precoder 1040, resource mappers 1050, and signal generators 1060. An operation/function of FIG. 20 may be performed, without being limited to, the processors 102 and 202 and/or the transceivers 106 and 206 of FIG. 19. Hardware elements of FIG. 20 may be implemented by the processors 102 and 202 and/or the transceivers 106 and 206 of FIG. 19. For example, blocks 1010 to 1060 may be implemented by the processors 102 and 202 of FIG. 19. Alternatively, the blocks 1010 to 1050 may be implemented by the processors 102 and 202 of FIG. 19 and the block 1060 may be implemented by the transceivers 106 and 206 of FIG. 19.

Codewords may be converted into radio signals via the signal processing circuit 1000 of FIG. 20. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in a time region and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 20. For example, the wireless devices (e.g., 100 and 200 of FIG. 19) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 21:
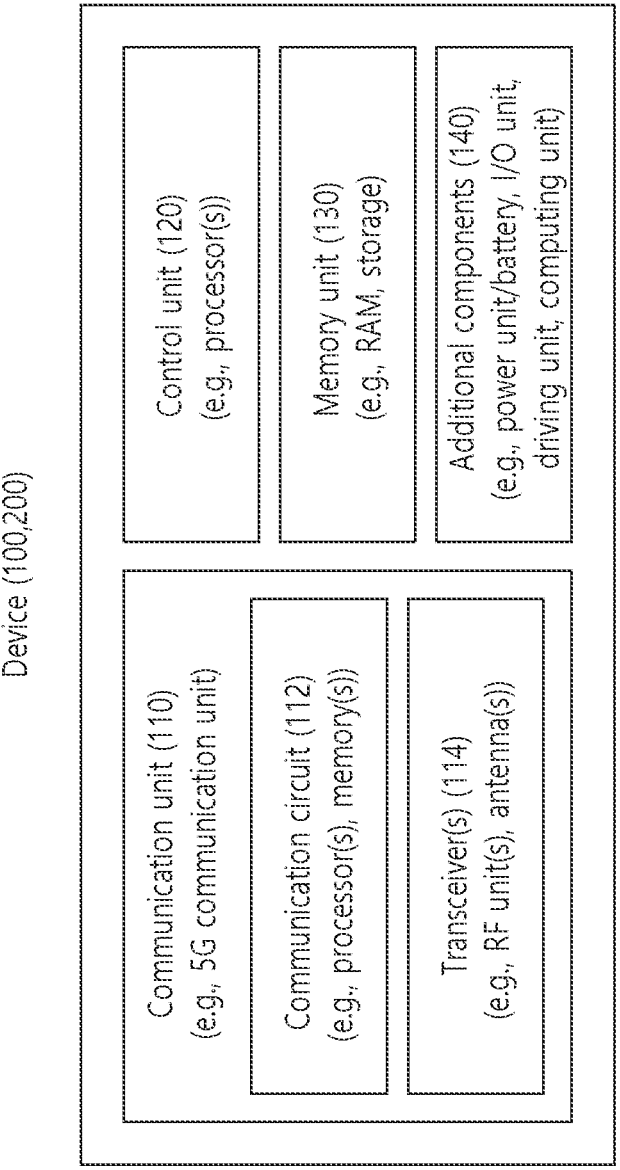
FIG. 21 shows a wireless device, in accordance with an embodiment of the present disclosure.

FIG. 21 shows another example of a wireless device, in accordance with an embodiment of the present disclosure. The wireless device may be implemented in various forms according to a use-case/service (refer to FIG. 18).

Referring to FIG. 21, wireless devices 100 and 200 may correspond to the wireless devices 100 and 200 of FIG. 19 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 19. For example, the transceiver(s) 114 may include the one or more transceivers 106 and 206 and/or the one or more antennas 108 and 208 of FIG. 19. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 18), the vehicles (100b-1 and 100b-2 of FIG. 18), the XR device (100c of FIG. 18), the hand-held device (100d of FIG. 18), the home appliance (100e of FIG. 18), the IoT device (100f of FIG. 18), a digital broadcast terminal, a hologram device, a public safety device, an MTC device, a medicine device, a fintech device (or a finance device), a security device, a climate/environment device, the AI server/device (400 of FIG. 18), the BSs (200 of FIG. 18), a network node, etc. The wireless device may be used in a mobile or fixed place according to a use-example/service.

In FIG. 21, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 21 will be described in detail with reference to the drawings.

Figure 22:
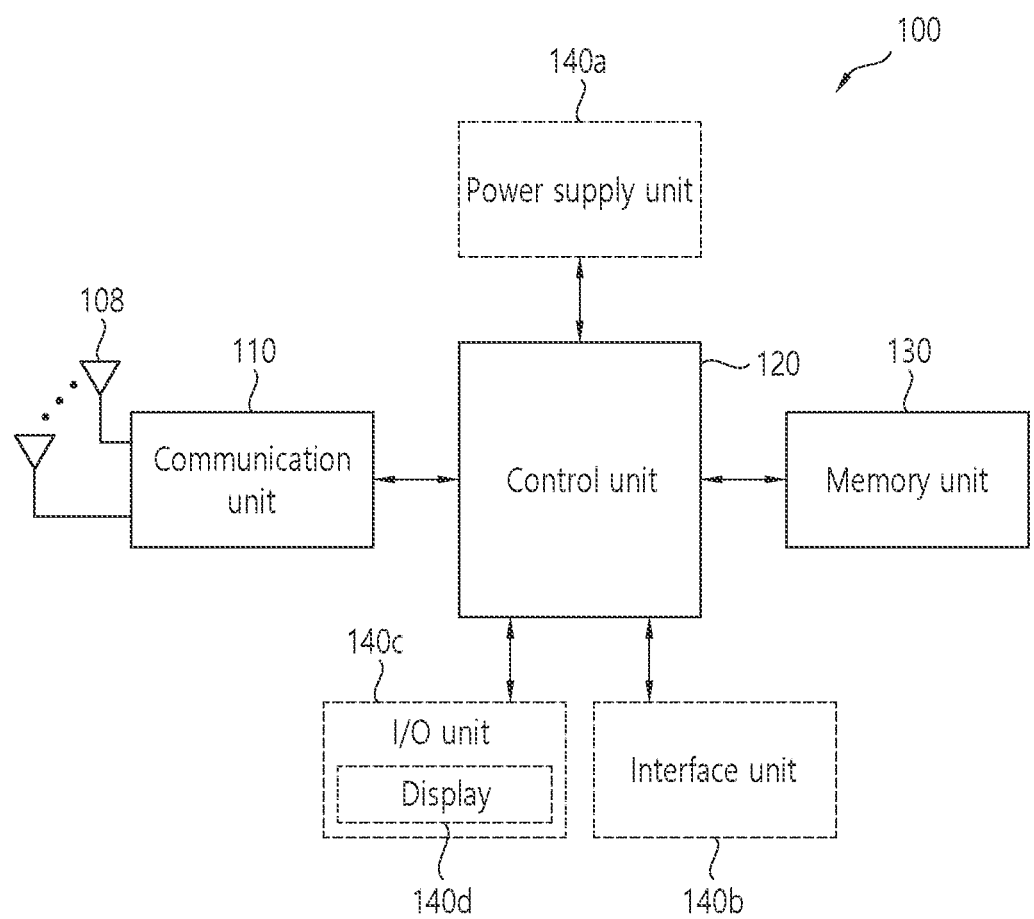
FIG. 22 shows a hand-held device, in accordance with an embodiment of the present disclosure.

FIG. 22 shows a hand-held device, in accordance with an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 22, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 21, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 23:
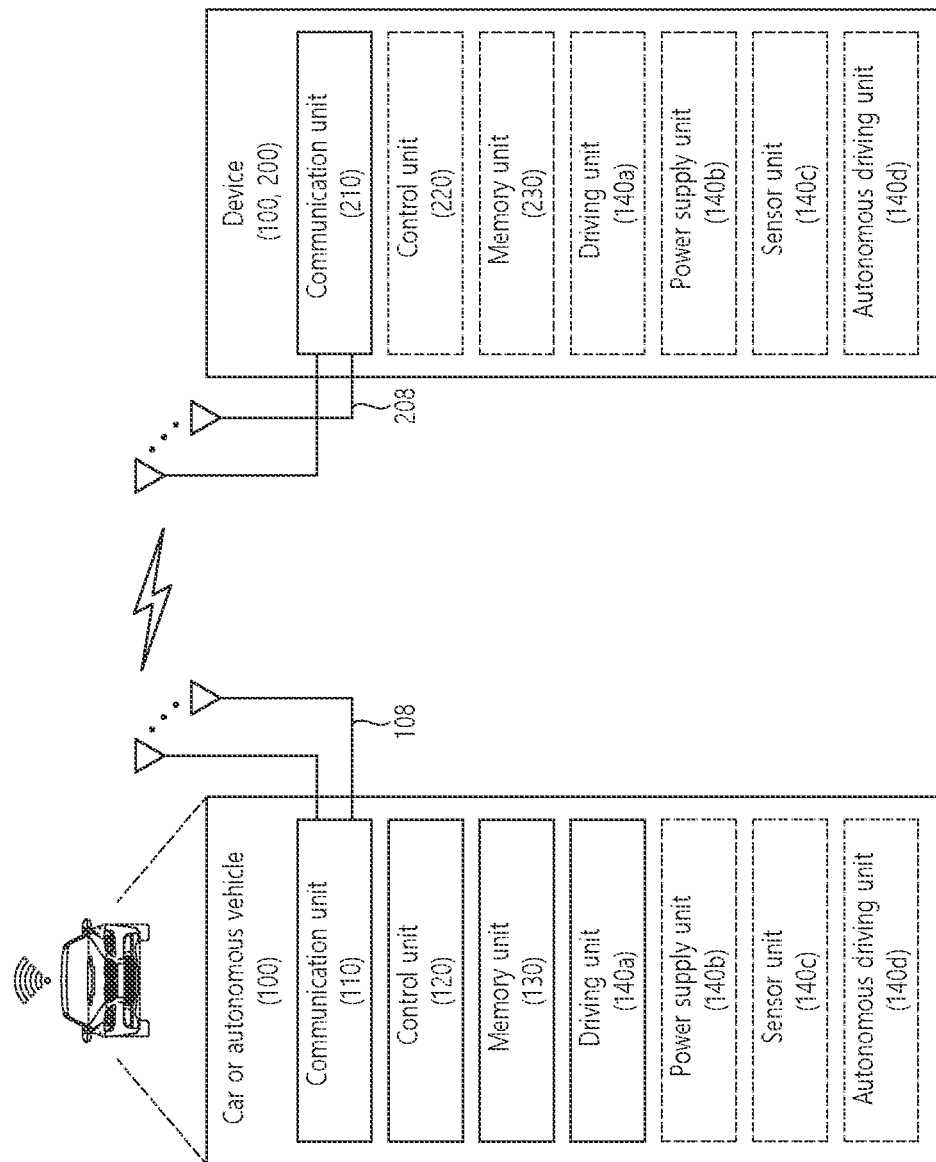
FIG. 23 shows a car or an autonomous vehicle, in accordance with an embodiment of the present disclosure.

FIG. 23 shows a vehicle or an autonomous vehicle, in accordance with an embodiment of the present disclosure. The vehicle or autonomous vehicle may be implemented by a mobile robot, a car, a train, a manned/unmanned Aerial Vehicle (AV), a ship, etc.

Referring to FIG. 23, a vehicle or autonomous vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 21, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140a may cause the vehicle or the autonomous vehicle 100 to drive on a road. The driving unit 140a may include an engine, a motor, a powertrain, a wheel, a brake, a steering device, etc. The power supply unit 140b may supply power to the vehicle or the autonomous vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method for performing, by a first apparatus, wireless communication, the method comprising:
   transmitting a data to a second apparatus through physical sidelink shared channel (PSSCH);
   receiving a hybrid automatic repeat request (HARQ) feedback related to the data from the second apparatus through physical sidelink feedback channel (PSFCH); and
   obtaining channel occupancy ratio (CR) for a transmission resource related to the data on a first slot,
   wherein a transmission resource related to the data, located after receiving the HARQ feedback, is released, and
   wherein a transmission resource related to the data released after the first slot is not considered in the CR.

2. The method of claim 1, wherein the CR is a value which is a sum of a number of subchannels used from a second slot to a third slot and a number of subchannels granted from a first time point to a fourth slot, divided by a total number of subchannels configured in a transmission pool from the second slot to the fourth slot,
  wherein the second slot and the third slot precede the first slot, and
  wherein the fourth slot follows the first slot.

3. The method of claim 1, wherein the CR is evaluated for each transmission related to the data.

4. The method of claim 2, wherein the first slot, the second slot, the third slot, and the fourth slot are determined based on a physical slot index.

5. The method of claim 1, wherein a pre-configured weight value is applied to the CR for the transmission resource related to the data, based on that the transmission resource related to the data, located after receiving the HARQ feedback is not released.

6. The method of claim 5, wherein the pre-configured weight value is a positive real value less than 1.

7. The method of claim 5, wherein the pre-configured weight value is applied to a number of subchannels related to the data.

8. The method of claim 1, wherein calculation of the CR for the transmission resource related to the data is triggered in the first slot.

9. The method of claim 1, wherein a transmission resource related to the data within a pre-configured time domain after the first slot is considered for the CR.

10. The method of claim 9, wherein the data is transmitted aperiodically.

11. The method of claim 1, wherein a number of subchannels related to the data is not considered in the CR.

12. The method of claim 1, wherein a CR limit value related to the CR is configured, based on that congestion control is configured, and
  wherein the CR limit value is configured based on at least one of a channel busy ratio (CBR) measurement value or a priority related to a service.

13. The method of claim 1, wherein a transmission resource related to the data released before the first slot after receiving the HARQ feedback is not considered in the CR.

14. A first apparatus for performing wireless communication, the first apparatus comprising:
  one or more memories storing instructions;
  one or more transceivers; and
  one or more processors connected to the one or more memories and the one or more transceivers, wherein the one or more processors execute the instructions to:
  transmit a data to a second apparatus through physical sidelink shared channel (PSSCH);
  receive a hybrid automatic repeat request (HARQ) feedback related to the data from the second apparatus through physical sidelink feedback channel (PSFCH); and
  obtain channel occupancy ratio (CR) for a transmission resource related to the data on a first slot,
  wherein a transmission resource related to the data, located after receiving the HARQ feedback, is released, and
  wherein a transmission resource related to the data released after the first slot is not considered in the CR.

15. An apparatus configured to control a first user equipment (UE), the apparatus comprising:
  one or more processors; and
  one or more memories operably connectable to the one or more processors and storing instructions, wherein the one or more processors execute the instructions to:
  transmit a data to a second UE through physical sidelink shared channel (PSSCH);
  receive a hybrid automatic repeat request (HARQ) feedback related to the data from the second UE through physical sidelink feedback channel (PSFCH); and
  obtain channel occupancy ratio (CR) for a transmission resource related to the data on a first slot,
  wherein a transmission resource related to the data, located after receiving the HARQ feedback, is released, and
  wherein a transmission resource related to the data released after the first slot is not considered in the CR.

* * * * *